United States Patent
Ranchod et al.

(10) Patent No.: US 12,143,394 B2
(45) Date of Patent: *Nov. 12, 2024

(54) METHOD, APPARATUS, AND COMPUTER PROGRAM PRODUCT FOR INSTALLING AND UPDATING THIRD PARTY APPLICATIONS REQUIRING VARIABLE HOST ADDRESS IDENTIFICATION IN A GROUP-BASED COMMUNICATION SYSTEM

(71) Applicant: Salesforce, Inc., San Francisco, CA (US)

(72) Inventors: Sachin Ranchod, San Francisco, CA (US); Brian Stephen O'Neill, San Francisco, CA (US); Amy Dong Shan, Redondo Beach, CA (US); Steven Chen, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,331

(22) Filed: May 27, 2022

(65) Prior Publication Data

US 2022/0303279 A1 Sep. 22, 2022

Related U.S. Application Data

(63) Continuation of application No. 16/519,576, filed on Jul. 23, 2019, now Pat. No. 11,388,171.

(Continued)

(51) Int. Cl.
*H04L 9/40* (2022.01)
*G06F 9/54* (2006.01)
(Continued)

(52) U.S. Cl.
CPC .............. *H04L 63/104* (2013.01); *G06F 9/54* (2013.01); *H04L 63/0853* (2013.01);
(Continued)

(58) Field of Classification Search
CPC ............... H04L 63/104; H04L 63/0853; H04L 65/403; H04L 67/01; H04L 67/53; H04L 63/0876; G06F 9/54; G06F 8/60
(Continued)

(56) References Cited

U.S. PATENT DOCUMENTS

2008/0148351 A1* 6/2008 Bhatia ................. G06F 21/6218
726/2
2015/0281225 A1* 10/2015 Schoen ................... H04L 63/08
726/9

(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — David R Lazaro
*Assistant Examiner* — Mariegeorges A Henry
(74) *Attorney, Agent, or Firm* — Holland & Hart LLP

(57) ABSTRACT

Embodiments of the present disclosure provide methods, systems, apparatuses, and computer program products that enable client devices to install integrations of a third party application that supports variable host address identification.

20 Claims, 11 Drawing Sheets

Related U.S. Application Data

(60) Provisional application No. 62/703,359, filed on Jul. 25, 2018.

(51) Int. Cl.
  *H04L 65/403* (2022.01)
  *H04L 67/01* (2022.01)
  *H04L 67/53* (2022.01)

(52) U.S. Cl.
  CPC ............ *H04L 65/403* (2013.01); *H04L 67/01* (2022.05); *H04L 67/53* (2022.05)

(58) Field of Classification Search
  USPC .......................................................... 726/2
  See application file for complete search history.

(56) References Cited

U.S. PATENT DOCUMENTS

| | | | |
|---|---|---|---|
| 2018/0287982 A1 | 10/2018 | Draeger et al. | |
| 2019/0253430 A1* | 8/2019 | Gamache | H04L 63/104 |
| 2019/0347082 A1* | 11/2019 | Gurtin | H04L 67/02 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

METHOD, APPARATUS, AND COMPUTER PROGRAM PRODUCT FOR INSTALLING AND UPDATING THIRD PARTY APPLICATIONS REQUIRING VARIABLE HOST ADDRESS IDENTIFICATION IN A GROUP-BASED COMMUNICATION SYSTEM

CROSS-REFERENCES TO RELATED APPLICATION(S)

This patent application is a continuation application claiming priority benefit, with regard to all common subject matter, of U.S. patent application Ser. No. 16/519,576, filed Jul. 23, 2019, and entitled "METHOD, APPARATUS, AND COMPUTER PROGRAM PRODUCT FOR INSTALLING AND UPDATING THIRD PARTY APPLICATIONS REQUIRING VARIABLE HOST ADDRESS IDENTIFICATION IN A GROUP-BASED COMMUNICATION SYSTEM" ("the '576 Application"). The '576 Application claims priority benefit, with regard to all common subject matter, of U.S. Patent Application No. 62/703,359, filed Jul. 25, 2018, and entitled "METHOD, APPARATUS, AND COMPUTER PROGRAM PRODUCT FOR INSTALLING AND UPDATING THIRD PARTY APPLICATIONS REQUIRING VARIABLE HOST ADDRESS IDENTIFICATION IN A GROUP-BASED COMMUNICATION SYSTEM." The identified earlier-filed patent applications are hereby incorporated by reference in their entirety into the present application.

BACKGROUND

Various messaging systems may support communication and collaboration among users. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

Embodiments disclosed herein are directed to managing a plurality of blueprint application integrations requiring variable host address identifications in a group-based communication system. The group-based communication system includes a group-based communication server, a group-based communication repository, and a plurality of group-based communication channels. An apparatus for managing a plurality of blueprint application integrations comprises at least one processor and at least one memory including computer program code. The memory and the computer program code are configured to, with the processor, cause the apparatus to perform a plurality of functions as disclosed herein.

The apparatus is thus configured to generate and transmit, in response to receiving from a client device a request to define the one or more integration parameters for the blueprint application, maximum scopes and features request interface data configured to cause a client device to render an interactive scopes and features request interface, the interactive scopes and feature request interface being configured to enable user authorization of defined scopes and features for a blueprint application integration that forms part of the plurality of blueprint application integrations; generate, in response to receiving from the client device a maximum scopes and features definition object comprising a user authorization of defined scopes and features for the blueprint application integration, an authentication token configured to enable the defined scopes and features for the blueprint application integration; cause token data associated with the authentication token to be transmitted to a third party application provider associated with the blueprint application; and generate and store, in the group-based communication repository, in response to receiving the maximum scopes and features definition object, a blueprint application integration row comprising one or more integration row entries, wherein the one or more integration row entries comprise information at least partially related to the blueprint application integration.

In some embodiments, the blueprint application is associated with a blueprint application identifier that uniquely identifies the blueprint application; and the one or more integration row entries comprise the blueprint application identifier. In some embodiments, the authentication token comprises one or more of (i) an integration identifier that uniquely identifies the blueprint application integration, (ii) a workspace identifier that uniquely identifies a workspace to which the blueprint application integration belongs, or (iii) a secret string; and the one or more integration row entries comprise the integration identifier. In some embodiments, causing token data associated with the authentication token to be transmitted to a third party application provider associated with the blueprint application comprises transmitting a token transmission payload to the client device, wherein the token transmission payload is configured to cause the client device to render token data associated with the authentication token and instructions for providing the token data to the third party application provider.

In some embodiments, the one or more integration row entries comprise one or more of (i) one or more variable host address identification placeholders, (ii) a plurality of enabled function placeholders, (iii) a plurality of blueprint application integration scope placeholders (iv) a blueprint application identifier that uniquely identifies the blueprint application; (v) an integration identifier that uniquely identifies the blueprint application integration, or (vi) the authentication token; the plurality of blueprint application integration scope placeholders are subsequently replaced by a plurality of blueprint application integration scopes that are at least partially defined by the maximum scopes and features definition object; and the group-based communication server initially causes a plurality of the one or more integration row entries to store null values. In some embodiments, the blueprint application is associated with a maximum scopes and features set; and the defined scopes and features for the blueprint application integration comprise one of (i) the maximum scopes and functions set or (ii) a subset of the maximum scopes and functions set.

In some embodiments, the blueprint application integration row is further configured to either store or point to a location in the group-based communication repository that stores a settings manifest file, the settings manifest file comprising information defining one or more of (i) at least one blueprint application integration scopes, (ii) at least one enabled function, (iii) at least one defined host address identification, or (iv) the authentication token. In some embodiments, the blueprint application is associated with a settings manifest file, the settings manifest file comprising information defining one or more of (i) at least one blueprint application integration scopes, (ii) at least one enabled function, (iii) at least one variable host address identification, or (iv) the authentication token.

In some embodiments, the computer program code is configured to further cause the apparatus to provide an integration information endpoint configured to receive an integration settings query payload, wherein the integration settings query payload comprises at least the authentication token; and provide an integration update endpoint configured to receive an integration update request payload, wherein the integration update request payload comprises at least the authentication token. In some embodiments, the computer program code is configured to further cause the apparatus to retrieve from the group-based communication repository, in response to receiving the integration settings query payload, a settings manifest file that comprises at least the authentication token; and transmit an integration settings response payload comprising information at least partially related to the settings manifest file.

In some embodiments, the integration update request payload comprises an updated settings manifest file; and the computer program code is configured to further cause the apparatus to access the group-based communication repository, in response to receiving the integration update request payload, and modify a settings manifest file associated with the authentication token, such that the manifest file associated with the authentication token matches the updated settings manifest file; and generate and transmit an integration update confirmation payload, wherein the integration update confirmation payload comprises the authentication token. In some embodiments, the integration update request payload comprises a plurality of parameters comprising one or more of the authentication token, the blueprint application integration identifier, or parameters defining a new scope or function for the blueprint application integration corresponding to the blueprint application integration identifier; and the computer program code is configured to further cause the apparatus to access the group-based communication repository, in response to receiving the integration update request payload, and modify the blueprint application integration row associated with the authentication token, wherein at least one new integration row entry is appended to the blueprint application integration row to store data associated with the new scope or function for the blueprint application integration, and wherein the at least one new integration row entry stores at least some of the parameters defining the new scope or function for the blueprint application integration.

Various embodiments of the present disclosure relate to a system for managing a plurality of blueprint application integrations requiring variable host address identifications comprises at least one server and at least one repository, the at least one server comprising at least one processor and at least one memory storing instructions that, when executed by the server, cause the system to provide an integration information endpoint configured to receive an integration settings query payload from the third party application provider, the integration settings query payload comprising the authentication token; provide an integration update endpoint configured to receive an integration update request payload from a third party application provider, the integration update request payload comprising the authentication token; in response to receiving the integration settings query payload, retrieve from the group-based communication repository the settings manifest file comprising the authentication token and transmit an integration settings response payload comprising information at least partially related to the settings manifest file; and in response to receiving the integration update request payload, d modify the settings manifest file within the group-based communication repository associated with the authentication token.

Various embodiments of the present disclosure are directed to a method for managing a plurality of blueprint application integrations requiring variable host address identifications in a group-based communication system comprising a group-based communication server, a group-based communication repository, and a plurality of group-based communication channels comprises the following operations: providing, using the group-based communication server, a blueprint application associated with a blueprint application identifier that uniquely identifies the blueprint application; providing, using the group-based communication server, a plurality of blueprint application integrations, wherein each blueprint application integration is associated with the blueprint application identifier, an authentication token that is uniquely generated for each blueprint application, and a blueprint application row stored in the group-based communication repository, the blueprint application row comprising one or more integration row entries storing information at least partially related to the blueprint application integration; and providing, using the group-based communication server, one or more resource endpoints configured to receive at least one function payload from the group-based communication server, wherein each of the one or more resource endpoints has a resource endpoint location that is fully defined by the one or more defined host address identifications, and wherein the third party application provider performs at least one processing action in response to receiving the at least one function payload.

In some embodiments, the one or more integration row entries comprise one or more of: (i) one or more variable host address identification placeholders, (ii) a plurality of enabled function placeholders, (iii) a plurality of blueprint application integration scope placeholders (iv) a blueprint application identifier that uniquely identifies the blueprint application; (v) an integration identifier that uniquely identifies the blueprint application integration, or (vi) the authentication token, wherein the plurality of blueprint application integration scope placeholders are subsequently replaced by a plurality of blueprint application integration scopes that are at least partially defined by the maximum scopes and features definition object, and wherein the group-based communication server initially causes a plurality of the one or more integration row entries to store null values. In some embodiments, the method further comprises sending an integration settings query payload and an integration update request payload, wherein the integration settings query payload and the integration update request payload comprise the authentication token; providing an integration information endpoint configured to receive the integration settings query payload; providing an integration update endpoint configured to receive the integration update request payload; in response to receiving the integration settings query payload, retrieving from the group-based communication repository the settings manifest file comprising the authentication token and transmitting an integration settings response payload comprising information at least partially related to the settings manifest file; and in response to receiving the integration update request payload, modifying, within the group-based communication repository, the settings manifest file associated with the authentication token.

Various embodiments of the present disclosure are directed to a system for managing a plurality of blueprint application integrations requiring variable host address identifications comprising (i) a group-based communication system comprising a group-based communication server, a group-based communication repository, a plurality of group-based communication channels, and (ii) a third party application provider. Here, the group-based communication system further comprises a blueprint application associated with a blueprint application identifier that uniquely identifies the blueprint application; the group-based communication system further comprises a plurality of blueprint application integrations, wherein each blueprint application integration is associated with the blueprint application identifier, an authentication token that is uniquely generated for each blueprint application, and a blueprint application row stored in the group-based communication repository, the blueprint application row comprising one or more integration row entries storing information at least partially related to (i) one or more defined host address identifications, (ii) a plurality of enabled functions, (iii) a plurality of blueprint application integration scopes, (iv) the blueprint application identifier; (v) the integration identifier, (vi) the authentication token and (vii) a settings manifest file, and the authentication token comprising (i) an integration identifier that uniquely identifies the blueprint application integration, (ii) a workspace identifier that uniquely identifies a workspace to which the blueprint application integration belongs, and (iii) a secret string; and the third party application provider comprises one or more resource endpoints configured to receive at least one function payload from the group-based communication server, wherein each of the one or more resource endpoints has a resource endpoint location that is fully defined by the one or more defined host address identifications, and wherein the third party application provider is further configured to perform at least one processing action in response to receiving the at least one function payload.

In certain embodiments of this system, the group-based communication server is further configured to provide an integration information endpoint configured to receive a integration settings query payload and provide an integration update endpoint configured to receive an integration update request payload. In response to receiving the integration settings query payload, the group-based communication server is further configured to retrieve from the group-based communication repository the settings manifest file that comprises at least an authentication token received with the integration settings query payload and the integration update request payload. Subsequent to retrieving the settings manifest file that comprises at least the authentication token, the group-based communication server is further configured to transmit an integration settings response payload comprising information at least partially related to the settings manifest file. In embodiments, the group-based communication server is further configured to, in response to receiving the integration update request payload, access the group-based communication repository and modify the settings manifest file associated with the authentication token.

BRIEF DESCRIPTION OF THE DRAWINGS

Figure 1:
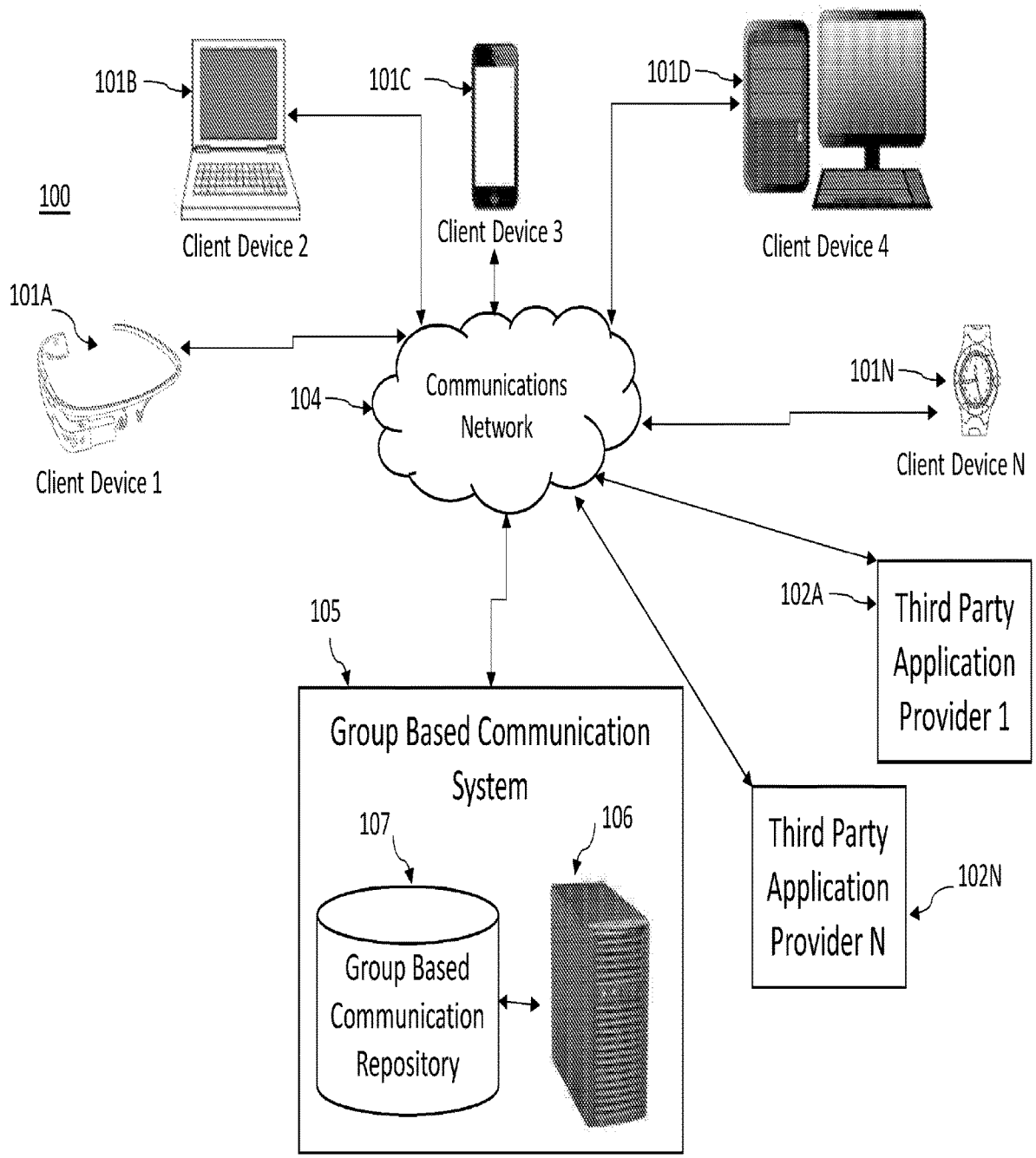
Figure 2:
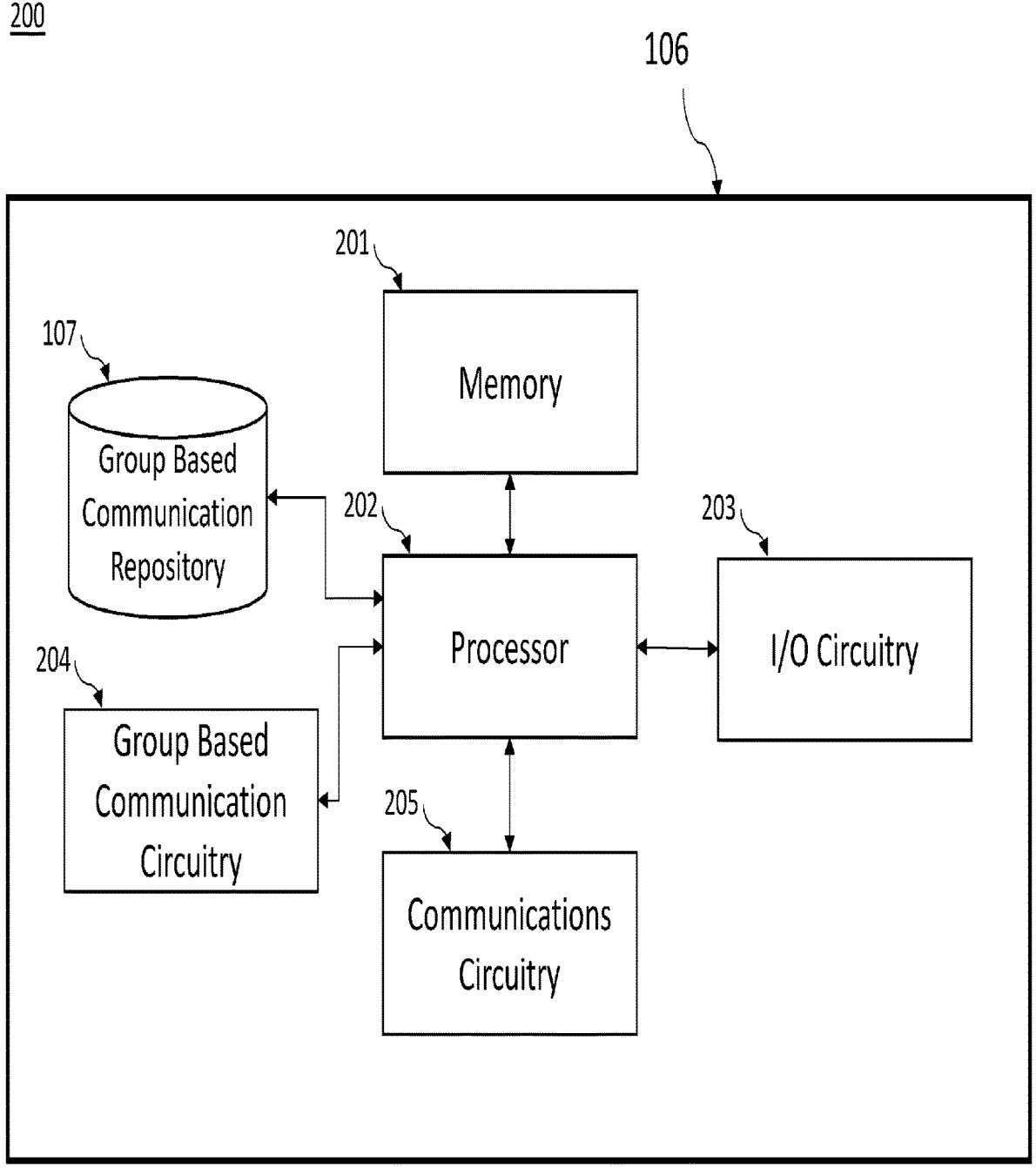
Figure 3:
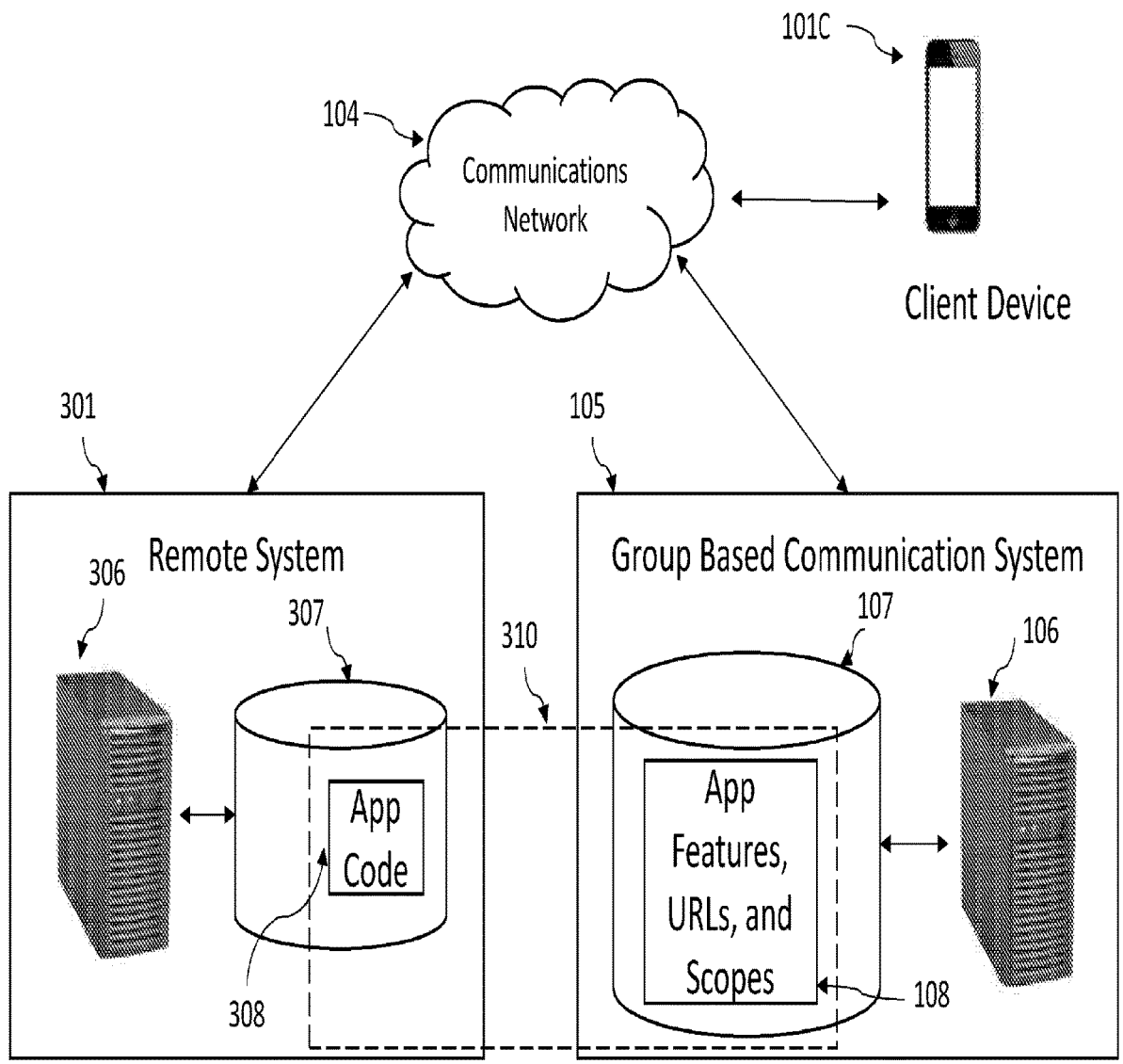
Figure 4:
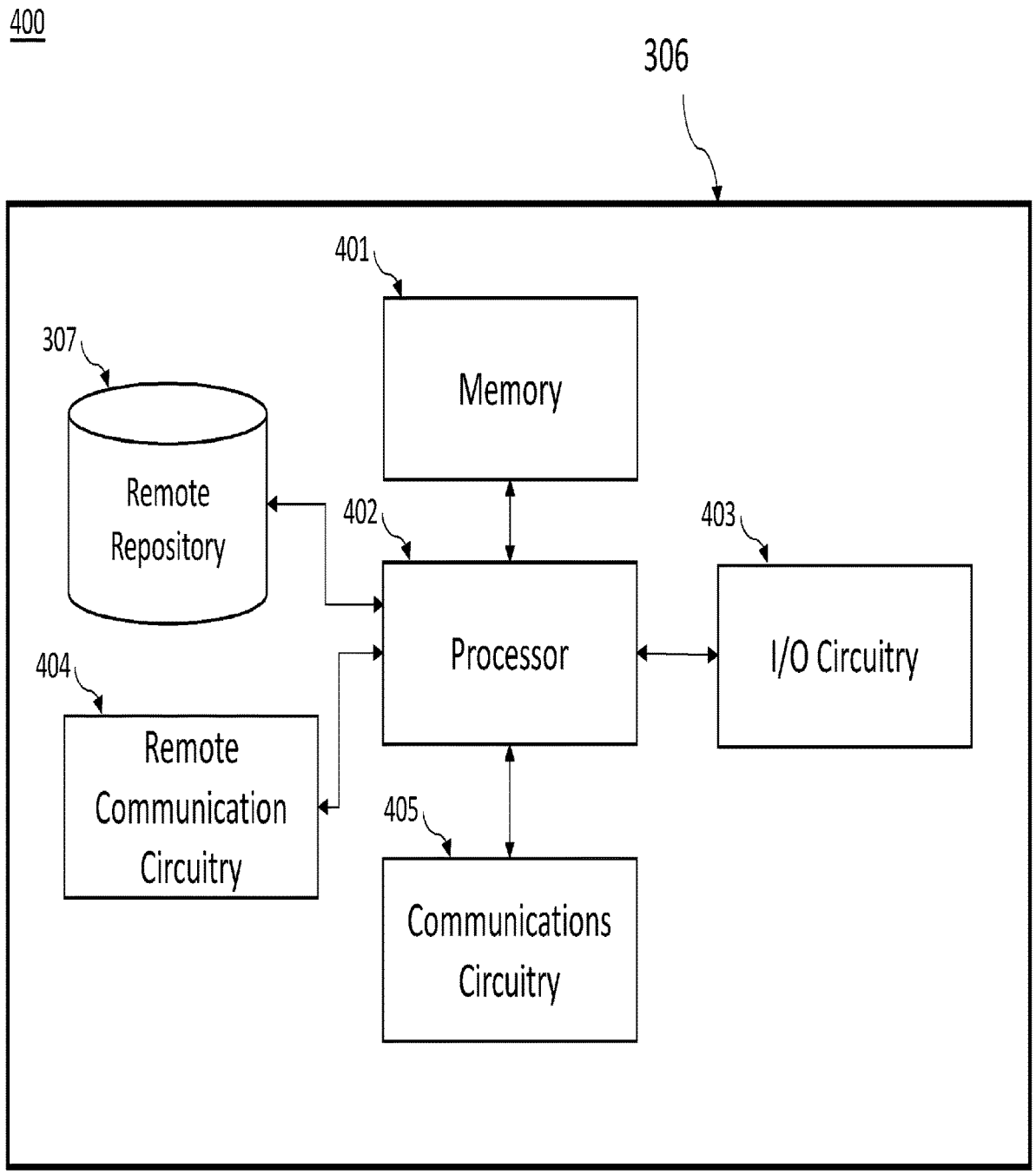
Figure 5:
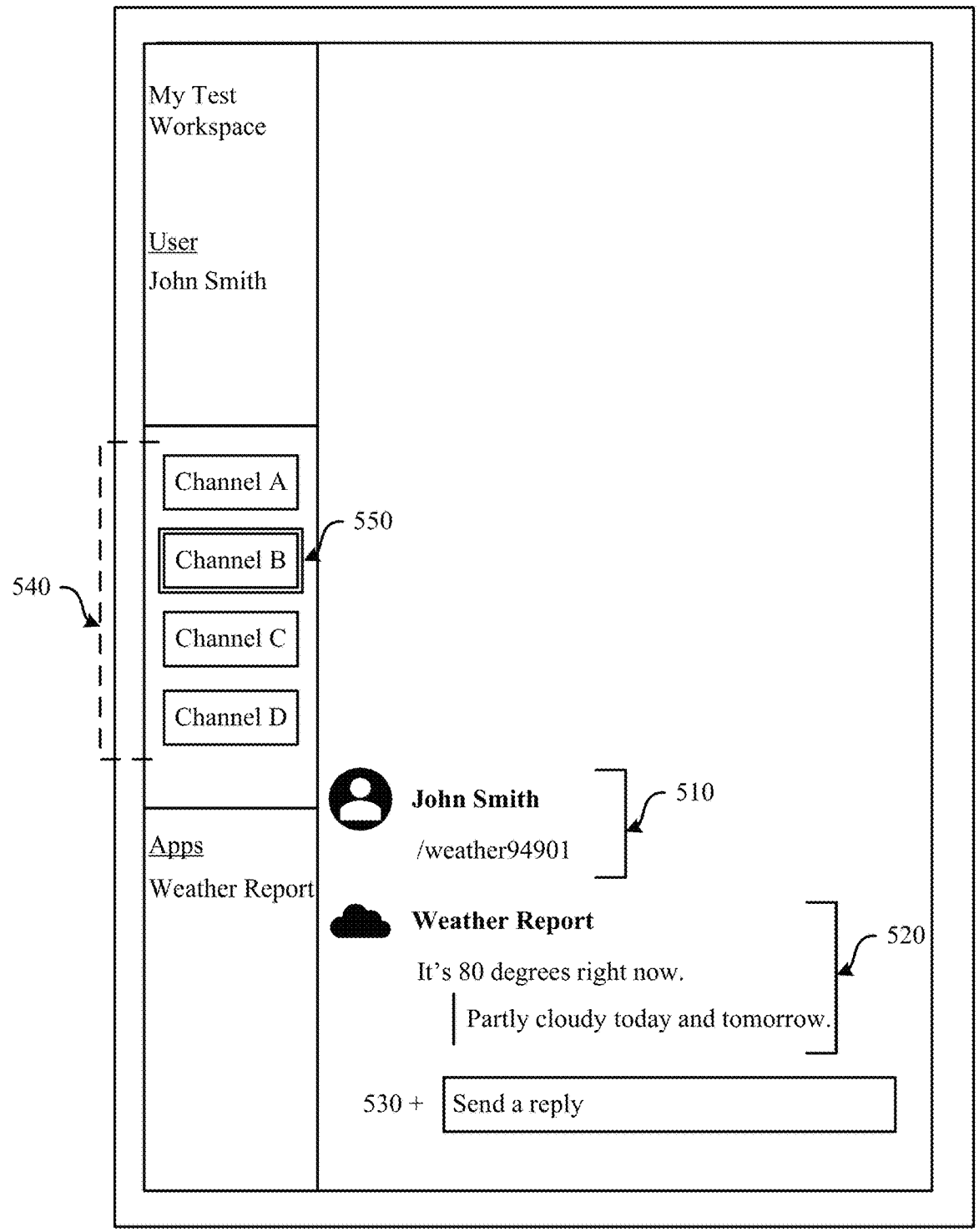
Figure 6:
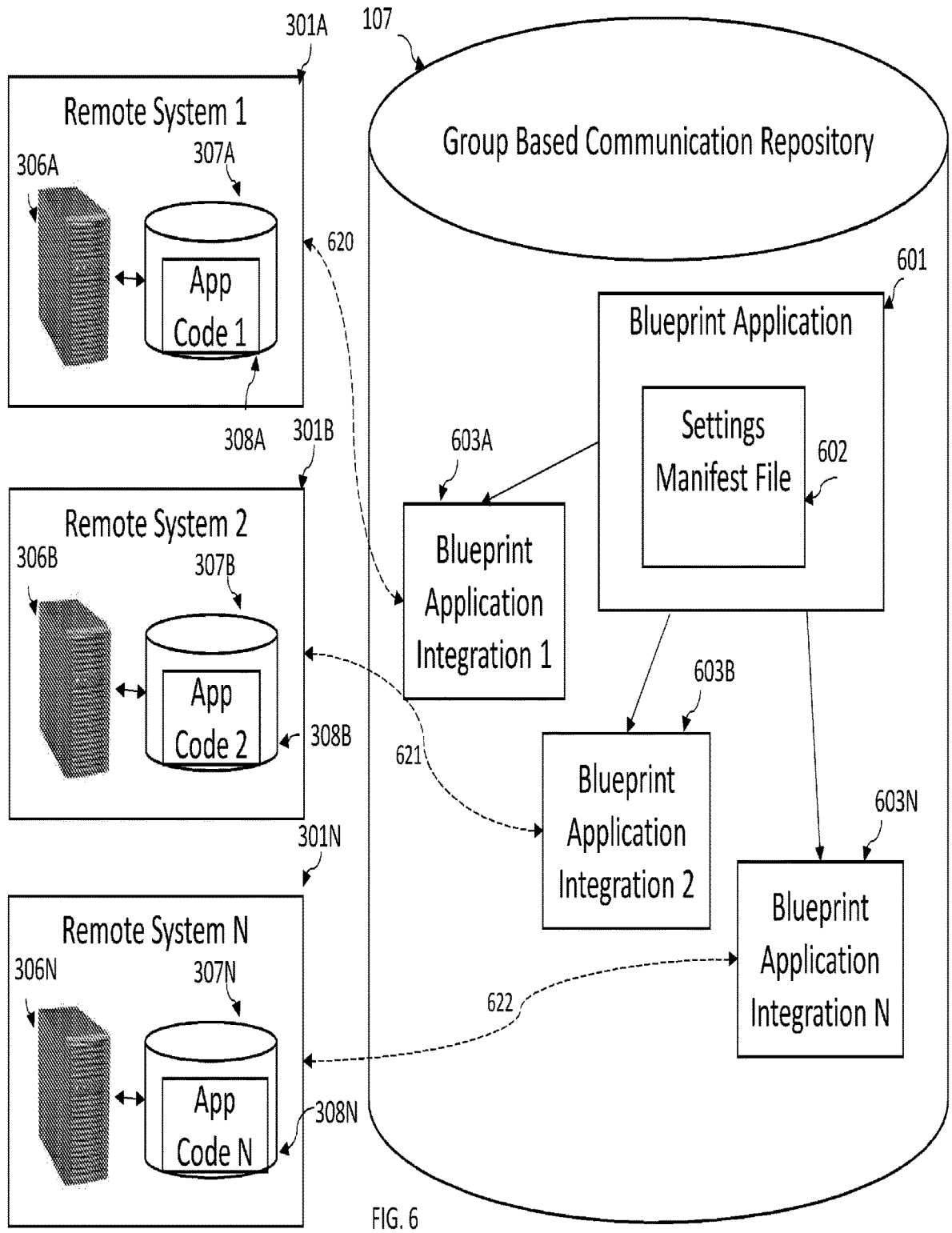
Figure 7:
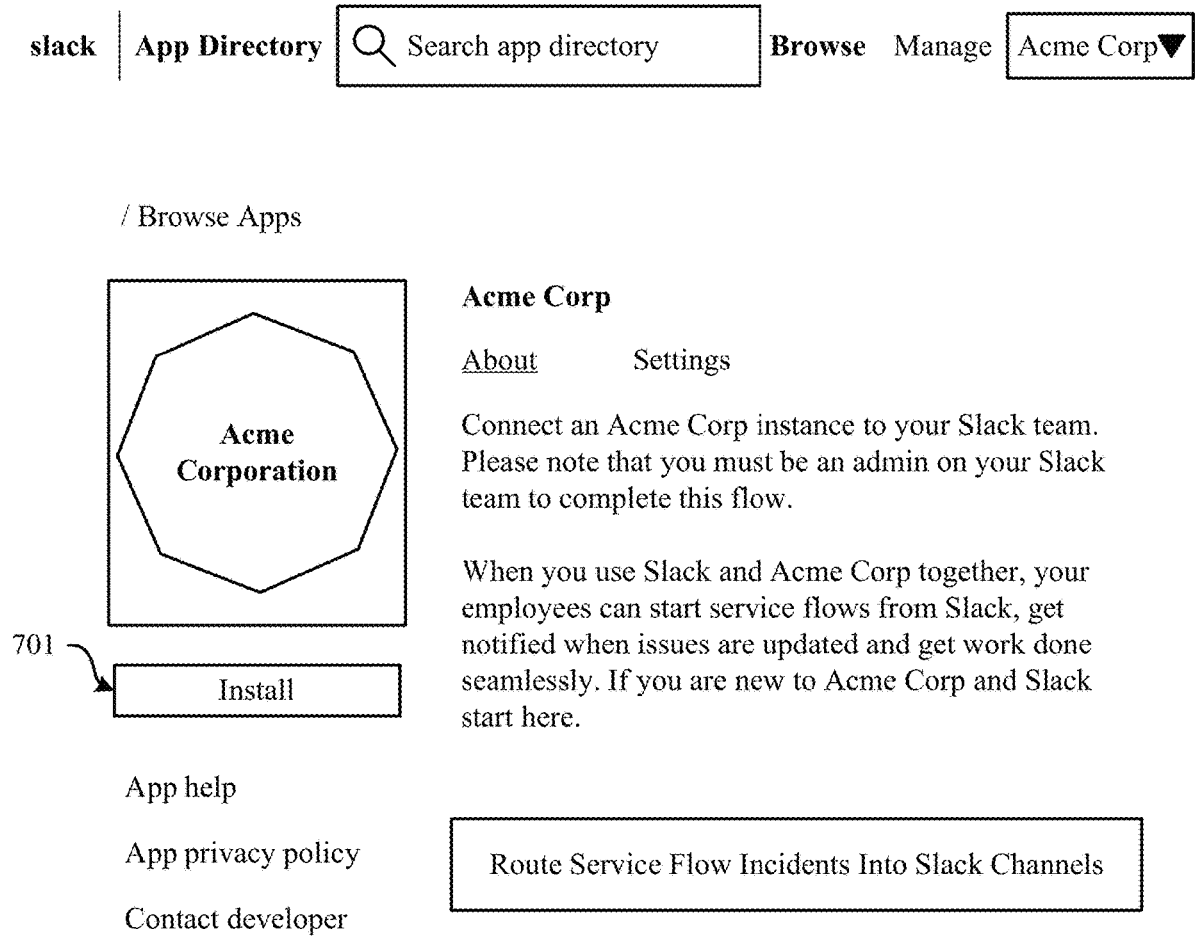
Figure 8:
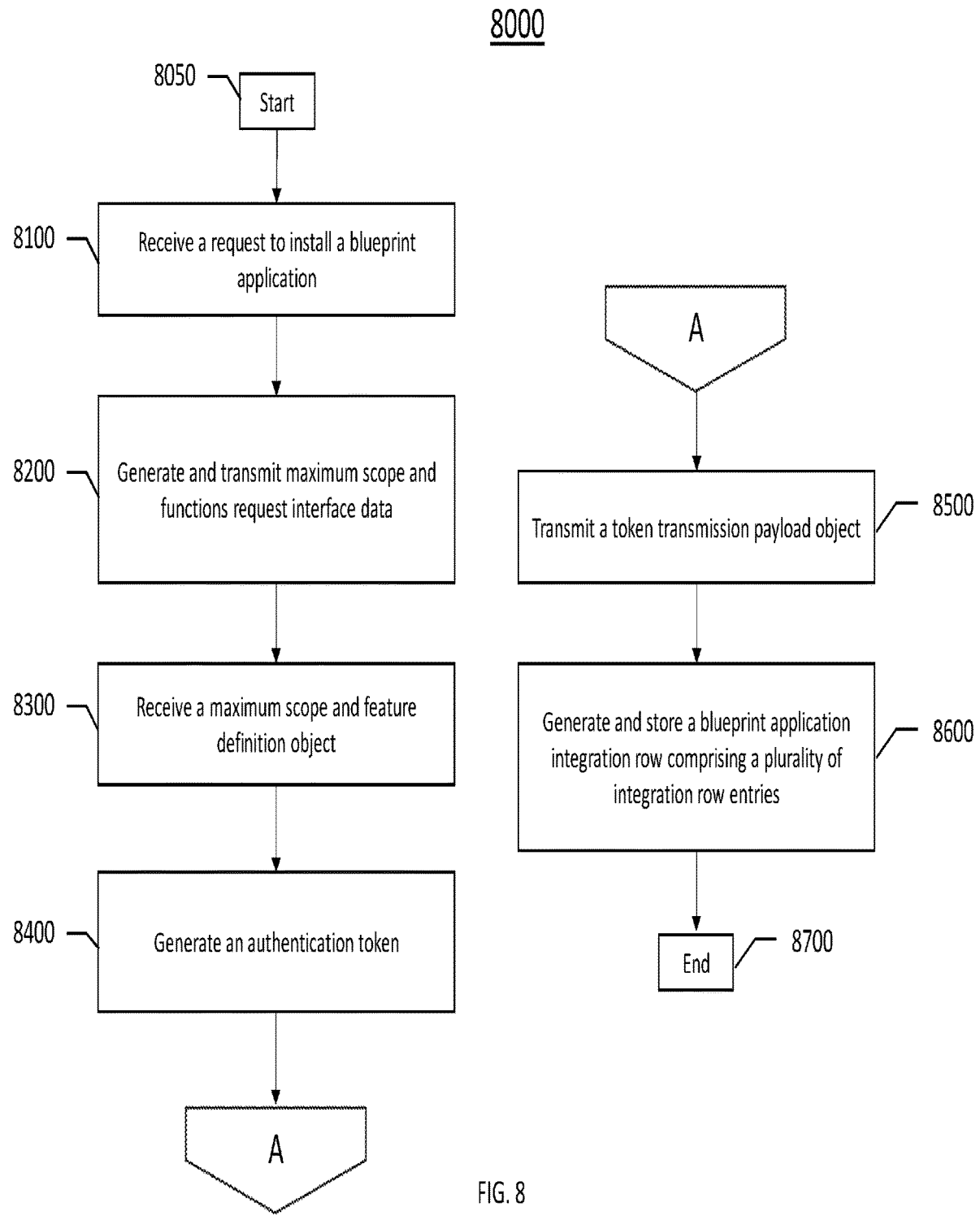
Figure 9:
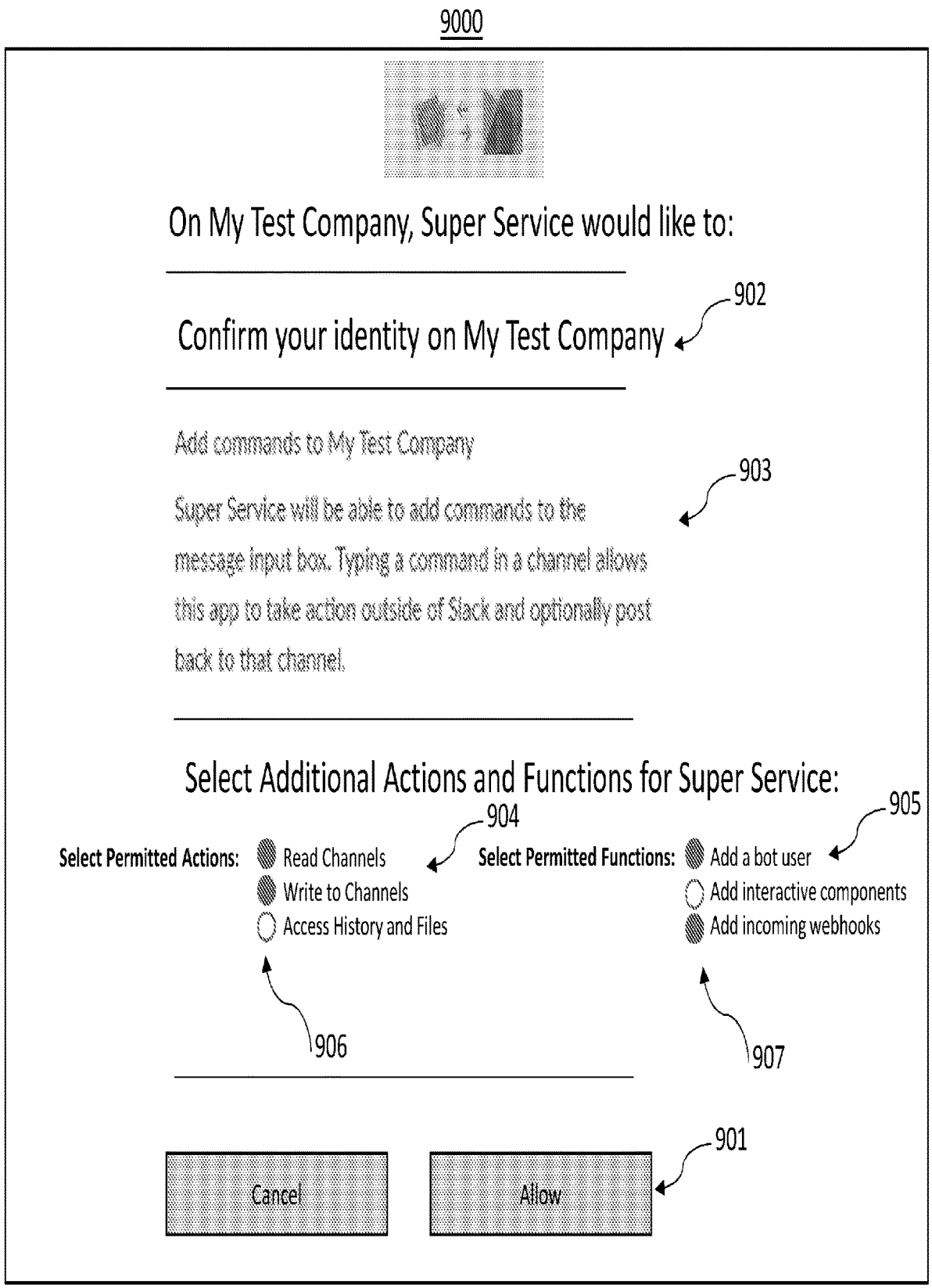
Figure 10:
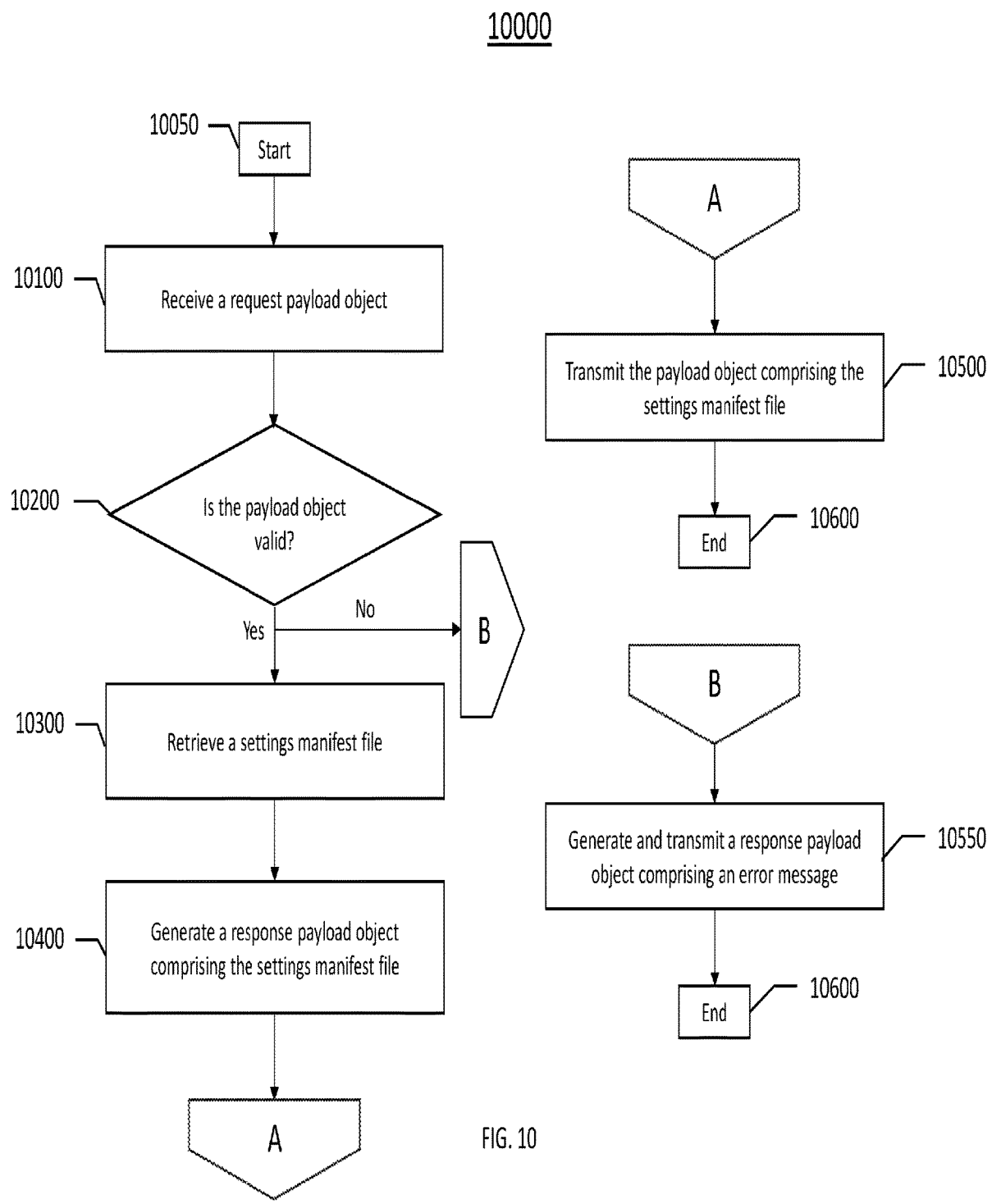
Figure 11:
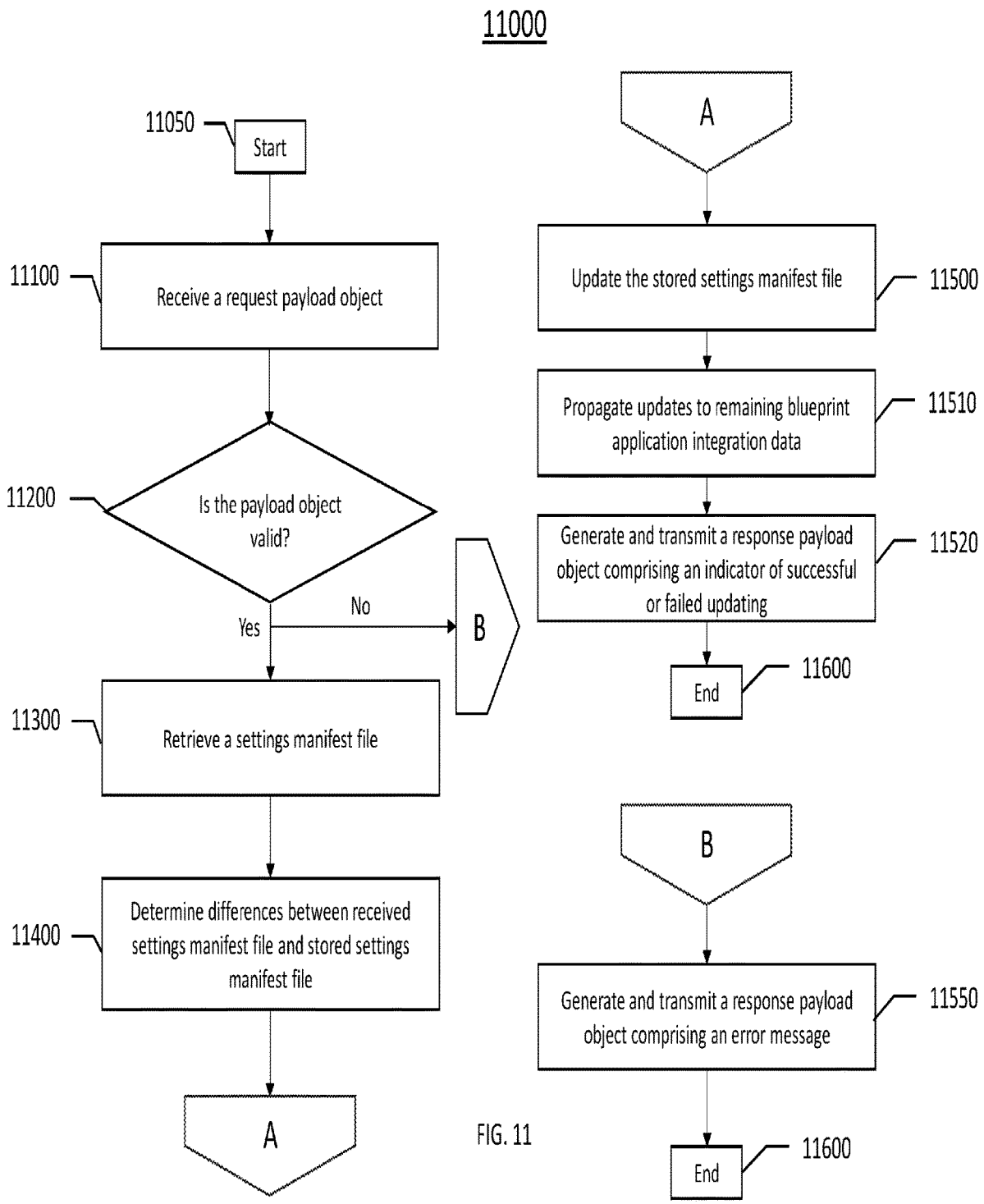

Having thus described the disclosure in general terms, reference will now be made to the accompanying drawings, which are not necessarily drawn to scale, and wherein:

FIG. 1 shows an example computing system within which embodiments of the present disclosure may operate;

FIG. 2 shows an exemplary apparatus for implementing embodiments of the present disclosure;

FIG. 3 shows an exemplary embodiment of a group-based communication system comprising a third party application provider, according to embodiments of the present disclosure;

FIG. 4 shows an exemplary apparatus for implementing embodiments of the present disclosure;

FIG. 5 shows an exemplary embodiment of a group-based communication interface that illustrates a function of a third party application, according to embodiments of the present disclosure;

FIG. 6 shows an exemplary embodiment of a group-based communication system comprising a blueprint application and a plurality of blueprint application integrations, according to embodiments of the present disclosure;

FIG. 7 shows an exemplary embodiment of an interface comprising an interactive third party application directory listing interface, according to embodiments of the present disclosure;

FIG. 8 is an exemplary flowchart embodying a method for installing a blueprint application, for use with embodiments of the present disclosure;

FIG. 9 shows an exemplary embodiment of an interface comprising an interactive third party application installation interface, according to embodiments of the present disclosure;

FIG. 10 is an exemplary flowchart embodying a method for retrieving a settings manifest file from the group-based communication system, according to embodiments of the present disclosure; and FIG. 11 is an exemplary flowchart embodying a method for updating a settings manifest file of a blueprint application integration, according to embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," "payload object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices. Each user of the group-based communication system is associated with at least one group identifier. Each group identifier is a unique number. For example, in one embodiment, the group identifier may be stored as a 64 bit unsigned integer and represented externally (outside of memory) as a base-34 encoded string.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication repository" refers to a location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

As used herein, the terms "third party application" or "third party resource" refer to a software program, platform, or service that is configured to communicate with the group-based communication system for providing service to a client device via a group-based communication interface. The third party application operates on a compiled code base or repository that is separate and distinct from that which supports the group-based communication interface. In at least one embodiment, the third party application may be integrated in a group workspace within a group-based communication system. In some embodiments, the third party application may communicate with the group-based communication system, and vice versa, through one or more application program interfaces (APIs). In some embodiments, the third party application receives tokens or other authentication credentials that are used to facilitate secure communication between the third party application and the group-based communication system in view of group-based communication system network security layers or protocols (e.g., network firewall protocols). For example, a third party application may be a Software as a Service ("SaaS") product or an Application ("App") product that is provided by a third party application provider and which is stored and maintained by the third party application provider.

As used herein, the terms "third party application provider" or "third party resource provider" refer to a provider of a third party application by way of a remote networked device, such as a server or processing device, maintained by a third party individual, company, or organization. A client device in a group-based communication system may access a third party application provided by the third party application provider to execute functions, flows, or actions. In some embodiments, the functions, flows, or actions produce an effect (e.g., an output, change, data modification, etc.) within the group-based communication system such as, for example, by manipulating data within the group-based communication system or posting messages within the group-based communication system, or executing some other action such as providing content to the group-based communication system for rendering in a group-based communication interface. In other embodiments, the functions, flows, or actions take effect within the third party application provider to produce an effect within the third party application provider. In yet other embodiments, the functions, flows, or actions produce effects within various combinations of the group-based communication system, the third party application provider, and other servers or systems.

As used herein, the term "third party application provider identifier" refers to one or more items of data by which a third party application provider that provides a third party application in a group-based communication system may be identified. For example a third party application provider identifier may comprise ASCII text, a pointer, a memory address, and the like.

As used herein, the term "third party application identifier" refers to one or more items of data by which a third party application within a group-based communication system may be identified. For example, a third party resource identifier may comprise ASCII text, a pointer, a memory address, and the like.

As used herein, the term "group-based communication object" refers to a collection of data and instructions that represent an item or resource of the group-based communication system. In some embodiments, third party applications are permitted to perform actions on one or more group-based communication objects. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, files created and maintained in the group-based communication system, files linked or uploaded to the group-based communication system, user accounts, emojis posted in a group-based communication channel, and the like.

The term "group-based communication interface" refers to a virtual communications environment configured to facilitate user interaction with a group-based communications system. Each group-based communication interface is accessible and viewable to a select group of users (i.e., users that are associated with a selected group identifier), such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.).

As used herein, the term "workspace" refers to a group of users and a set of group-based communication objects all of which are associated with a common group identifier. Thus, users sharing a group identifier also share group-based communication objects. In other words, users sharing a common group identifier that is also shared by a set of group-based communication objects may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

As used herein, the term "blueprint application" refers to a type of third party application that supports variable host address identifications. A blueprint application includes at least one data structure that has information necessary to install the third party application in a workspace. In certain embodiments, the at least one data structure is a blueprint application row, but any other data structure capable of storing blueprint application data may also be employed. Because a blueprint application is a third party application, the integration of the third party application is a blueprint application integration, a term that is further defined below.

A blueprint application serves as a template that forms the basis for each blueprint application integration. In certain embodiments, the data structure(s) associated with a blueprint application store a name and an icon or image corresponding to the blueprint application. In certain embodiments, the data structure(s) associated with a blueprint application include a settings manifest file, which is further discussed below. However, in some other embodiments, the data structure(s) associated with a blueprint application do not include the settings manifest file. In certain embodiments, the data structures associated with a blueprint application also include a blueprint application identifier.

In certain embodiments, the data structure(s) associated with a blueprint application store a set of maximum requested scopes and maximum requested features for the blueprint application. In these embodiments, during installation of the blueprint application, the group-based communication system is configured to request user authorization for the maximum requested scopes and maximum requested features on behalf of the blueprint application. In certain embodiments, the data structure(s) associated with a blueprint application store a set of minimum requested scopes and minimum requested features for the blueprint application. In these embodiments, during installation of the blueprint application, the group-based communication system is configured to request user authorization for the maximum requested scopes and maximum requested features on behalf of the blueprint application. The minimum requested scopes and features comprise the minimum permissions required by an installed blueprint application (i.e. a blueprint application integration) to operate as intended.

After receiving user authorization for such maximum requested scopes and features and after installing the blueprint application, and thus generating a blueprint application integration, the group-based communication system is configured to support updates to the blueprint application integration. In certain embodiments, if the updates to a blueprint application integration do not exceed the set of user-granted maximum scopes and maximum features, then the group-based communication system is configured to update the blueprint application integration without requiring additional user authorizations and/or authentications. On the other hand, if the updates to a blueprint application integration would exceed the set of user-granted maximum scopes and maximum features, then the group-based communication system is configured to require a user authentication and a later user authorization of the additional scopes and features. To generate a fully operational blueprint application integration, the group-based communication system may require information and/or configuration steps that supplement the information stored in the blueprint application's data structure(s). For example, the defined host address identifications may be separately supplied to the blueprint application integration, the host address identifications can differ among the plurality of blueprint application integrations that the group-based communication generates from a single blueprint application.

As used herein, the term "blueprint application identifier" refers to one or more items of data by which a blueprint application within a group-based communication system may be identified. For example, a blueprint application identifier may comprise ASCII text, a pointer, a memory address, and the like.

As used herein, the term "blueprint application row" refers to a data structure that holds or points to information defining a blueprint application. Such information may be referred to herein as blueprint application data. In different embodiments, the blueprint row holds or points blueprint application data such as one or more of a name, icon, image, maximum requested scopes, maximum requested features, blueprint application identifier, a settings manifest file, and the like. To provide further context, the group-based communication system may use a blueprint row as the reference data structure from which a plurality of blueprint application integrations may be generated.

As used herein, the term "settings manifest file" refers to a set of instructions in the form of machine-readable code that specify the settings of a blueprint application integration. In some embodiments, the settings manifest file is embodied as an instruction set written in JSON (JavaScript Object Notation). However, any other scripting language or computer programming language may be used to embody the settings manifest file. The settings manifest file thus includes instructions that define all the settings of a blueprint application integration that is generated at the installation stage of a blueprint application. The settings manifest file defines the available scopes, host address identifications, and the functional features enabled for the blueprint application integration. In at least one embodiment, the settings manifest file comprises defined host address identifications. In an alternative embodiment, the settings manifest file comprises variable host address identifications. The settings manifest file is modifiable by external entities by way of API calls transmitted to a group-based communication server. Thus, a settings manifest file permits external entities to update the settings of a blueprint application integration. Settings manifest files, are stored in blueprint application rows and/or blueprint application integration rows, depending on the embodiment of the group-based communication system.

As used herein, the term "user identifier" refers to one or more items of data by which a user within a group-based communication system may be identified. For example, a user identifier may comprise ASCII text, a pointer, a memory address, and the like.

As used herein, the term "defined host address identification" refers to one or more items of data which together contain all the information necessary to locate a network endpoint or resource with which a communication link may be established. A defined host address identification includes at least a domain portion which comprises a domain name (otherwise referred to as a domain-name portion). However, a defined host address identification also includes a suffix if the suffix is necessary information to locate a network endpoint or resource. In some exemplary and non-limiting embodiments, the defined host address identification may be a URL ("Uniform Resource Locator). In that sense, the defined host address identification includes a domain and a URL path—the suffix.

As used herein, the term "variable host address identification" refers to one or more items of data which together describe or contain information necessary to support the ability to identify various locations associated with a plurality of network endpoints or resources. The need for variable host address identification arises in the context of network endpoints or resources that vary over time or across integrations of a third party application. Because the location of such network endpoints or resources vary, the host address identification used to describe such network endpoints or resources may also vary accordingly. A variable host address identification supports the ability to locate such variable network endpoints or resources. To provide further context, in one exemplary embodiment, a variable host address identification may be supported via a settings manifest file that includes one or more host address identifications. The settings manifest file may be stored in or referenced by data a blueprint application integration row. Thus, each blueprint application integration row, which is associated with a different blueprint application integration, stores a different settings manifest file. This enables the blueprint application integrations to have one or more host address identifications that differ from the host address identifications associated with other blueprint application integrations.

As used herein, the term "blueprint application integration" refers to an installed instance of a blueprint application in a workspace of the group-based communication system. A blueprint application integration includes at least one data structure that holds blueprint application integration data, which is information defining and supporting the operation of the blueprint application integration. The data structure(s) holding the blueprint application integration data is stored in a group-based communication repository. In certain embodiments, the data structure(s) holding the blueprint application integration data is a blueprint application integration row. In certain embodiments, the data structure(s) holding the blueprint application integration data include(s) at least one or more placeholders for one or more variable host address identifications, enabled functional features, maximum features, maximum scopes, a blueprint application integration identifier, a blueprint application identifier, and a blueprint application integration credentials set including a blueprint application integration token. In other embodiments, the data structure(s) that hold(s) the blueprint application integration data stores or points to this data as opposed to only holding one or more placeholders for the data. In certain embodiments, the data structure(s) that store the blueprint application integration data also store(s) a settings manifest file. In certain embodiments, the variable host address identifications are replaced with defined host address identifications.

A fully operational blueprint application integration is a software program or service that is configured to communicate with the group-based communication system for providing service to a client device via a group-based communication interface. The blueprint application integration operates on a compiled code base or repository that is separate and distinct from that which supports the group-based communication interface. In certain embodiments, the compiled code base or repository is located at a remote location from the group-based communication system. As already discussed above, the blueprint application integration further relies on one or more data structure(s) stored in the group-based communication system; the one or more data structure(s) support the operations of the blueprint application integration within the group-based communication system by storing blueprint application integration data. In that sense, the blueprint application integration comprises the compiled code base at a remote location and one or more data structure(s) stored in the group-based communication system.

To carry out the processes that provide services to the client device, the blueprint application integration requires a communication link between the remote location where the compiled code is stored and the group-based communication system. A fully operational blueprint application integration thus requires one or more defined host address identifications in order to support such a communication link. In certain embodiments, the defined host address identifications are stored in the data structure(s) that store the blueprint application integration data. The host address identifications contain all the information necessary to locate the network endpoint or resource where the group-based communication system may send payload objects to support the operation of the blueprint application integration.

As used herein, the term "blueprint application integration identifier" refers to one or more items of data by which a blueprint application integration within a group-based communication system may be identified. For example, a blueprint application integration identifier may comprise ASCII text, a pointer, a memory address, and the like.

As used herein, the term "blueprint application integration row" refers to a data structure that holds blueprint application integration data. In certain embodiments, the blueprint application integration row holds at least one or more defined host address identifications that identify one or more network endpoints or resources with which a communication link may be established. In certain embodiments, the blueprint application integration row includes at least one or more placeholders for one or more variable host address identifications, enabled functional features, maximum features, maximum scopes, a blueprint application integration identifier, a blueprint application identifier, and a blueprint application integration credentials set including a blueprint application integration token. In other embodiments, the blueprint application integration row stores or points to this data as opposed to only holding one or more placeholders for the data. In certain embodiments, the blueprint application integration row also stores a settings manifest file. In certain embodiments, the variable host address identifications are replaced with defined host address identifications.

As used herein, the term "maximum scopes and features definition object" refers to a data structure that holds information that defines permissions for a blueprint application integration. More specifically, a maximum scopes and features definition object comprises information indicating the types of actions that a blueprint application integration may take with respect to group-based communication objects. These are referred to as scopes. Some potential actions may include, for example and without limitation, adding messages to public group-based communication channels in the test workspace, creating files in the test workspace, posting emojis to private group-based communication channels, modifying attributes in user accounts associated with the test workspace, reading and processing data posted in a specific group-based communication channel, modifying files posted in a plurality of group-based communication channels, adding bot users to workspaces and/or group-based communication channels, and the like. Additionally, a maximum scopes and features definition object comprises information indicating the types of functional features that a blueprint application integration may incorporate and support. For example, blueprint application integrations may potentially include and incorporate features such as one or more slash commands, incoming webhooks, interactive components, event subscriptions, OAuth processes, and a bot user, and the like. Thus, the maximum scopes and features definition objects specifies which of these functional features the blueprint application integration has permission to incorporate in its operations.

In certain embodiments, the maximum scopes and features definition object includes information regarding the workspace where a blueprint application integration is to be installed and other information necessary to set the permissions granted to the blueprint application integration. To provide further context, in one exemplary embodiment, a client device generates a maximum scopes and features definition object during an installation process associated with a blueprint application. The client device generates the maximum scopes and features definition object in response to receiving a permission authorization via a user input. The client device sends the maximum scopes and features definition object to a group-based communication server, which then properly sets the permissions associated with the blueprint application integration.

As used herein, the term "interactive scopes and features request interface" refers to a modal or dedicated interface component that is rendered to a group-based communication interface and is configured to enable user authorization of permission requests made on behalf of a blueprint application integration. The interactive scopes and features request interface also presents viewable information regarding the permissions being requested. As a result of receiving a user authorization of permission requests, via the interactive scope request interface, a client device generates a maximum scopes and features definition object. The interactive scopes and features request interface is presented on a display screen of a client device.

As used herein, the term "interactive app installation interface" refers to a modal or dedicated interface component that is rendered to a group-based communication interface and is configured to enable a user to confirm a request to install a blueprint application in a workspace. The interactive app installation request interface also presents viewable information regarding the authorization being requested.

As used herein, the term "permission authorization" refers to a data structure that holds information indicating that a user has provided an input authorizing a request to grant one or more permissions to a third party application. A permission authorization may be represented via a temporary code that notifies a recipient that a user has authorized the request. To provide further context, a permission authorization is generated in response to a user interaction with an interactive scope and features interface. A user causes the client device to generate a permission authorization by interacting with, for example, a specific actuator button that forms part of the interactive scope and features request interface.

As used herein, the term "Application Settings API" refers to an API that enables one or more computing devices (e.g., one or more external client devices) to update and configure properties of one or more blueprint application integrations. For example, the Application Settings API may enable an external client device to define and/or update (e.g., expand or limit) a defined scope of a blueprint application integration. As another example, the Application Settings API may enable an external client device to define and/or update one or more group-based communication interfaces associated with a blueprint application integration. As yet another example, the Application Settings API may enable an external client device to revoke a blueprint application integration.

Overview

Various embodiments of the present disclosure generally relate to a method, apparatus, and system for installing a third party application (i.e. a blueprint application) that supports variable host address identifications in a group-based communication system. Additionally, the disclosure provided herein discloses a method, apparatus, and system that enables external entities to access the settings corresponding to instances of the third party application (i.e. blueprint application integrations). For example, external systems to the group-based communication system may use an API to request and update the settings of the various instances of the third party application (i.e. blueprint application integrations).

The need for third party applications that support variable host address identifications arises in the context of a single third party application that is installable on a plurality of separate workspaces of a group-based communication system, and wherein each workspace requires that the third party application establish a communication link with a different network endpoint definable via a host address identification. The need also arises in the context of a specific integration of the third party application requiring a communication link with host addresses that may vary over time and after the third party application has been installed to one or more workspaces of the group-based communication system. In these contexts, the developer of the third party application cannot predict with particularity, during the development and testing phases of the third party application, the plurality of network endpoints with which the third party application may communicate during its operations. Thus, the embodiments described herein disclose a group-based communication system that supports third party applications that support variable host address identifications.

To provide additional context, a third party application requires support for variable host address identification if a third party application is installed in two or more workspaces (these would correspond to two integrations) of a group-based communication system, the two or more workspaces have resources located at different locations, and the third party application may communicate with the differing locations to function properly within each workspace.

Because third party applications within the group-based communication system may support numerous, robust, and flexible functions, it is not possible to exhaustively enumerate every scenario where variable host addresses may be required. However, one such example may be illustrated by the implementation of an interactive button implemented in a workspace. In one embodiment, an interactive button may require that the group-based communication system send a payload object to a URL when a user of the group-based communication system interacts with the interactive button in a workspace. For example, a third party application may require that the payload object be sent to a server that manages a database for an enterprise. In this particular embodiment, the interactive button could, for example, be configured to cause a remote system to manipulate entries in a database storing information associated with an enterprise. In such an embodiment, the aforementioned URL includes information that identifies the location of the server that has access to the database of the enterprise.

The need to support variable host address identifications should now be apparent. In embodiments, each workspace in the group-based communication system may support a different enterprise, each of which may have a server located at a different location. Even though it is possible for two or more enterprises to share the same server or servers, when the group-based communication system scales to a large-enough size, a scenario will occur where two enterprises require access to two different servers. Thus, the integration of the third party application in the workspaces associated with these two enterprises would require a connection to the different servers. That is, the third party application requires that the payload object be sent to different locations depending on the workspace where the interactive button is actuated. In other words, if the interactive button is actuated within the workspace associated with enterprise A, then the group-based communication server may send the payload object to the location where the server for enterprise A is located. On the other hand, if the interactive button is actuated within the workspace associated with enterprise B, then the group-based communication server may send the payload object to the location where the server for enterprise B is located.

Third party applications, after they are developed, can become publicly available to users of a group-based communication system for installation. Thus, a developer of a third party application supporting the interactive-button feature that was just described would not be able to predict, at the development stage, all the possible locations where payload objects would have to be sent. Every enterprise that could install the third party application to a workspace of the group-based communication system likely would have a different server located at a different location. In this scenario, as facilitated by the present disclosure, a developer may implement a blueprint application. The blueprint application supports variable host addresses which are definable after the installation stage of the blueprint application onto a workspace. In this manner, each enterprise may specify the required host address identifications for their own integration. After creating a blueprint application integration, an enterprise would retain the ability to configure the host address identifications to support host addresses that vary over time.

As a result of the disclosures disclosed herein, each new integration of a third party application that requires a new custom URL (identifying the network endpoints or resources for communication links) does not require that a developer build a new third party application from scratch before making it available to end users of the group-based communication system.

The various embodiments disclosed herein provide for an efficient method of installing blueprint applications that support variable host address identifications within a group-based communication system. The blueprint applications, upon installation onto a new workspace that requires one or more custom URLs to obtain the desired functionality from the blueprint application, may be configured via an API call that gives external entities access to the settings of a blueprint application integration. In this manner, the resources expended in building functionalities that support separate communication links with separate network endpoints for separate integrations of the functionalities are reduced. The functionalities work across integrations requiring a connection to separate network endpoints that may vary from one integration to another, or that may vary over time after the integration is installed in a workspace.

Thus, the various embodiments disclosed provide for a more efficient group-based communication system. For example, by reducing the number of implementations required to support variable host addresses (i.e. instead of having a new third-party-application implementation for each custom URL, the disclosed disclosure allows one implementation that supports one or more integrations, each of which may support connections to custom URL(s)), the storage requirements on the system have been reduced. As a consequence of the reduced number of data structures and flows implemented on the group-based communication system, the size and cost of the infrastructure required to implement the group-based communication system and the third party application integrations may also be reduced. Thus, the solutions provided in this disclosure may be employed to obtain a more efficient and improved group-based communication system.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC ("remote procedural call), JSON over REST("Representational State Transfer")/HTTP ("HyperText Transfer Protocol"), and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
     <client_UDID>3XXXXXXXXXXXXXXXXXXXXXXXXD</client_UDID>
        <client_OS>iOS</client_OS>
        <client_OS_version>7.1.1</client_OS_version>
```

```
    <client_app_type>app with webkit</client_app_type>
    <app_installed_flag>true</app_installed_flag>
    <app_name>nickname.app</app_name>
    <app_version>1.0 </app_version>
    <app_webkit_name>Mobile Safari</app_webkit_name>
    <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
<client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_identifier>
    <team_identifier>ID_team_1</team_identifier>
    <channel_identifier>ID_channel_1</channel_identifier>
    <contents>That is an interesting disclosure. I have attached a copy our patent
policy.</contents>
    <attachments>patent_policy.pdf</attachments>
</message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
```

```
    <response>liked by ID_user_2</response>
    <response>starred by ID_user_3</response>
  </responses>
  <contents>That is an interesting disclosure. I have attached a copy
  our patent policy.</contents>
  <attachments>patent_policy.pdf</attachments>
  <conversation_primitive>
    conversation includes messages: ID_message_8, ID_message_9,
    ID_message_10,
      ID_message_11, ID_message_12
  </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
    SELECT
    FROM MSM_Message
    WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 101A-101N to enable message sharing therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101A-101N.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Third Party Applications Overview

FIG. 3 shows an exemplary embodiment comprising a third party application of a group-based communication system. Remote system 301 may be embodied by a third party application provider such as 102A-102N, a client device such as 101A-101D, or some other remotely located computing system. Remote system 301 is separate and remote from the group-based communication system 105. The remote system 301 comprises a remote server 306 and a remote repository 307. The remote server 306 may comprise similar hardware features as group-based communication server 106 previously described in detail with reference to FIG. 2. In that sense, remote server 306 may be embodied by one or more computing systems, such as apparatus 400 shown in FIG. 4. The apparatus 400 may include a processor 402, a memory 401, input/output circuitry 403, communications circuitry 405, remote repository 307, and remote communication circuitry. The various features of apparatus 400 are analogous to the various features of apparatus 200 which have already been discussed in detail herein. Thus, the next section will highlight only the differences between the various features of apparatus 400 and the features of apparatus 200.

Apparatus 400 comprises a remote communication circuitry 404 which includes hardware configured to support the remote system 301. The remote communication circuitry 404 may utilize processing circuitry, such as the processor 402, to perform these actions. The remote communication circuitry 404 may send and/or receive data from remote repository 307. In some implementations, the sent and/or received data may be of digital content objects. It should also be appreciated that, in some embodiments, the remote communication circuitry 404 may include a separate processor, specially configured field programmable gate array (FPGA), or application specific interface circuit (ASIC).

Returning to FIG. 3, the remote repository 307 stores therein a compiled code base 308. The compiled code base 308 comprises machine-readable code that, when executed by the remote server 306, configures the remote server 306 to execute processes that support the operation of a third party application 310. The third party application 310 comprises the compiled code base 308 and third party application data stored at the group-based communication system 105, which is configured separately from the remote system 301.

Remote server 306 thus provides for receiving of electronic data from various sources, including but not limited to the group-based communication system 105. For example, the remote server 306 may be operable to receive and transmit payload objects from and to the group-based communication system 105. The remote server 306 is configured to send and receive the payload objects through the communications network 104.

In certain embodiments, the remote server 306 is configured to communicate with the group-based communication system 105 through one or more application program interfaces (APIs). To that end, the remote server 306 may send payload objects to network endpoints defined by host address identifications. These network endpoints are locations where the group-based communication system 105 is configured to receive payload objects comprising data associated with third party application functions. The group based communication system 105 is thus configured to utilize the payload object sent by the remote server 306 in order to execute actions associated with third party applications. Similarly, the remote server 306 may receive payload objects at network endpoints that are definable by host address identifications. The received payload objects comprise information related to processes associated with the third party application. Thus, in these embodiments, the remote server 306 is configured to execute certain actions in association with a third party application, in response to receiving the payload objects from the group-based communication system 105.

The group-based communication system 105 comprises the previously discussed group-based communication server 106 and the group-based communication repository 107. The group-based communication repository 107 stores third party application data 108 therein. The third party application data 108 comprises digital content that specify the scopes, defined host address identifications, and enabled functional features of a third party application.

The application scopes refer to a pairing of (a) an object type and (b) an action. In this manner, the application scope defines an action and an associated object type of the group-based communication system. For example, to provide context, granting an application scope to a third party application enables the third party application to take a particular action with regards to a group-based communication object that is of the type specified by the application scope.

The third party application data comprising the defined host address identifications comprises information regarding the locations to which the group-based communication system 105 may send a payload object as part of the operations implemented by the third party application. The host address identifications, in certain embodiments, are network endpoint or resources that are configured to accept and process payload objects in order to provide the services associated with the third party application.

A third party application 310 will be described with reference to an exemplary and non-limiting embodiment to provide further clarity of the concepts just described. FIG. 5 illustrates an exemplary embodiment of a group-based communication interface that illustrates the function of a third party application. In FIG. 5, the group-based communication interface 500 displays a workspace, My Test Workspace, to which a user John Smith belongs. Because John Smith has access to My Test Workspace, the user account corresponding to user John Smith is necessarily associated with the same group identifier corresponding to My Test Workspace.

My Test Workspace comprises a plurality of group-based communication objects such as group-based communication channels, Channels A-D (see FIG. 5, item 540), and the user account for John Smith. However, My Test Workspace could include other group-based communication objects such as emojis, direct messages, digital files including text, spreadsheets, images, audio, or the like.

As illustrated in the left-hand side of the group-based communication interface 500, My Test Workspace has one third party application installed therein: Weather Report.

As illustrated in FIG. 5, Channel B has been selected for view as indicated by the perimeter of the icon 550 representing Channel B in the group-based communication interface 500. Accordingly, the right-hand-side section of the group-based communication interface 500 displays the contents of the Channel B, which is a group-based communication channel 501. The group-based communication channel 501 comprises an input text box 530, which enables a user to input text. The client device receives user inputs intended as input text for input text box 530. In response to receiving the user inputs intended as text for input text box 530, the client device sends a payload object to the group-based communication system 105 for processing. The group-based communication server 106 parses the payload object to determine the appropriate processing action. In this case, the group-based communication server 106 determines that the payload object comprises a message posted by user John Smith to Channel B of My Text Workspace. Then, the group-based communication server 106 sends the message for storing to the group-based communication repository 107. The group-based communication server 106 causes the group-based communication repository 107 to associate the posted message with group-based communication Channel B via the object identifier corresponding to Channel B. Additionally, the group-based communication server 106 causes the group-based communication repository 107 to associate the posted message with the user identifier corresponding to the user John Smith. The group-based communication repository 107 may store additional information regarding the posted message such as the time of day when it was posted. After storing the message, the group-based communication server 106 is thus configured to send, to the client device, a payload object configured to cause the client device to render the posted messages on Channel B as shown by post 510 in FIG. 5.

In the particular embodiment of FIG. 5, user John Smith input the phrase "/weather 94901" into the input text box 530, which caused the group-based communication system 105 to send a payload object that causes the client device to render the message shown in Channel B as illustrated FIG. 5, item 510.

In this particular embodiment, in addition to storing the posted message and causing the client device to display the posted message, the group-based communication server 106 performs additional functions in relation to that message. During the parsing step, the group-based communication server 106 determines that the posted message comprises a slash command. In other words, in the particular embodiment of FIG. 5, the posted message took the form of a slash followed by a command name—i.e. the message comprises "/weather 94901." A slash command is one of the plurality of possible functional features implemented by a third party application. Here, the group-based communication server 106 determines that the particular slash command received with the payload object is associated with the third party application Weather Report.

In response to determining that the payload object comprises a slash command associated with the Weather Report third party application, the group-based communication server 106 determines the correct URL (i.e. a network endpoint) to which it may send a request message associated with the slash command. The correct URL is stored in the group-based communication repository as third party application data associated with the Weather Report third party application. For example, the association may occur via a third party application identifier. After determining the correct URL, the group-based communication server 106 sends a payload object comprising the slash command that user John Smith invoked. An exemplary, non-limiting embodiment of the data comprising the payload object associated with the slash command, "/weather 94901," is provided below.

```
token=gIkuvaNzQIHg97ATvDxqgjtO
   group_id=T0001
   team_domain=example
   channel_id=C2147483705
   channel_name=test
   user_id=U2147483697
   user_name=Steve
   command=/weather
   text=94901
   response_url=https://hooks.slack.com/commands/1234/5678
```

In the context of FIG. 3, the group-based communication server 106 sends the payload object associated with the slash command "/weather 94901" to a URL hosted by remote system 301. The URL, which is stored in the group-based communication repository 107 as part of the third party application data, specifies the network location of the network endpoint or resource where the remote system 301 is configured to receive the payload object associated with the slash command "/weather 94901."

The remote system 301 is configured to process the payload object to support/implement the operations and services rendered by the Weather Report third party application. In response to receiving the payload object, the remote server 306 first validates the data received in the payload object by confirming that the third party application token matches a authentication token previously received by the group-based communication server 106. In some embodiments, the authentication token is stored in the remote repository 307. In certain embodiments, the group-based communication server 106 generates and sends, to the remote server 306, the authentication token shortly after third party application Weather Report is installed in My Test Workspace. The authentication token is unique to the instance of the Weather Report third party application that is installed in My Test Workspace.

In addition, during the validation step, the remote server 306 may also validate the group identifier received with the payload object.

In the circumstance that the remote server 306 determines that the token received as part of the payload object does not match what is stored in the remote repository 307 for the Weather Report third party application, the remote server 306 returns an error message and performs no further actions. Similarly, if the group identifier and third party application identifier received with the payload object do not match the group identifier associated with the third party application identifier as stored in the remote repository 307, the remote server 306 returns an error message and performs no further actions.

On the other hand, if the remote server 306 successfully validates the payload object, the remote server 306 proceeds with the proper action as defined in the compiled code base 308. In the particular embodiment of FIG. 5, the remote server 306 generates a payload object as a response to the slash command. Then, the remote server 306 transmits the response payload object to the group-based communication system 105. The remote server 306 sends the payload object to the response URL specified in the received payload object, i.e. "response_url=https://hooks.slack.com/commands/1234/5678." An exemplary embodiment of the data comprising the response payload object associated with the "/weather 94901" command is reproduced below.

```
{
    "response_type": "in_channel",
    "text": "It's 80 degrees right now.",
    "attachments": [
        {
            "text"/"Partly cloudy today and tomorrow"
        }
    ]
}
```

In response to receiving the response payload object at the correct URL and within a pre-determined period of time (for example, 3000 milliseconds), the group-based communication server 106 parses the payload object to determine the proper action to execute. In this particular embodiment, the group-based communication server 106 determines that the response payload object comprises a message to be posted in Channel B, and the message includes the text "It's 80 degrees right now. Partly cloudy today and tomorrow." Thus, the group-based communication server 106 causes the group-based communication repository 107 to associate the message with Channel B of My Test Workspace, and then sends a payload object to the client device. The payload object is configured to cause the client device to render the newly posted message that the Weather Report third party application generated as a result of the user invoking the slash command. FIG. 5, item 520, shows the resulting message from invoking the slash command.

Third party application data 108 associated with the Weather Report third party application comprises the proper features, URLs, and application scopes to enable the Weather Report third party application to carry out the operations associated with the slash command. The third party application data 108 therefore comprises app features specifying that the Weather Report includes a slash command that may be invoked when a user provides an input comprising "/weather 94901." The third party application data 108 comprises application scopes specifying that the Weather Report third party application may read and post messages in Channel B of My Test Workspace. Finally, as previously discussed, the third party application data 108 comprises at least one defined host address identification in the form of a URL, which is the location where the group-based communication serve 106 may send a payload object after a user invokes the slash command.

It will be appreciated that the discussion of FIG. 5, the Weather Report third party application, and the slash command "/weather 94901," are merely illustrative. A third party application may include additional functional features. For example, a third party application may, in addition to a slash command, include one or more incoming webhooks, interactive components, event subscriptions, OAuth processes, a bot user, and many other functional features not expressly described herein. The incoming webhooks functional feature enables third party applications to post messages from external sources into the group-based communication system 105. The messages may be posted to group-based communication channels or may be sent directly to users as direct messages. To provide incoming webhooks, third party applications simply send a payload object to a defined host address identification (i.e. a URL) specifying a location hosted the group-based communication system 105. The group-based communication server 106 may, in response to receiving a payload object associated with an incoming webhook, send a response payload object to a defined host address identification specifying a location hosted by the remote system 301.

Interactive components may comprise, for example, interactive buttons, links, messages, dialogs that may be displayed in a group-based communication interface 500. As part of the interactive component functionality, the group-based communication server 106 may be configured to send a payload object to a defined host address identification the specifies a location hosted by the remote system 301. To provide further context, an interactive button may be incorporated in a group-based communication channel, which is rendered via a display of a client device. The client device, in response to receiving a user input indicating activation of an interactive button, is configured to send a payload object to the group-based communication server 106. In turn, the group-based communication server 106 may send, to the remote system 301, a payload object associated with the activation of the interactive button. In response, the remote system 301 may be configured to carry out processing steps in association with the payload object that is associated with the activation of the interactive button.

Event subscriptions may comprise, for example, a functional feature implemented by a third party application where the third party application is notified of certain events that occur in the group-based communication system. Thus, the third party application may carry out certain processes in response to determining that one or more events have occurred. As some non-limiting examples, a third party application may receive a notification that an emoji has been posted in a group-based communication channel or that a file has been created in a workspace. In certain embodiments, the notifications may be triggered by events specified with granularity, such as a notification being sent when a particular emoji has been posted in a particular group-based communication channel (for example, when a "smile" emoji has been posted in Channel B of My Test Workspace). In other embodiments, the notifications may be triggered by general events, such as a notification being sent when any file has been created in My Test Workspace. The event subscriptions functional feature requires that the group-based communication server 106 send a payload object to a remote system 301. The mechanics of sending and receiving these payload objects have already been discussed above and will not be repeated here as they would be readily understood by a person having ordinary skill in the art.

Similarly, a third party application that incorporates a bot user—an automated user in a workspace that can interact with users of the group-based communication system through a group-based communication channel—also requires that the group-based communication server 106 send payload objects to the remote system 301. A third party that incorporates authentication processes (for example, OAuth 1.0 or 2.0) requires a defined host address specifying a network location hosted by a remote system 301. In certain embodiments, authentication processes used to authenticate users require that the group-based communication system 105 redirect users back to a remote system 301 at the conclusion of the authentication process. The group-based communication system 105 thus requires a defined host address identification specifying a network location hosted by the remote system 301 in order to support a third party application that incorporates an authentication functionality.

Blueprint Applications and Blueprint Application Integrations

As described above, third party applications may implement various functional features, may have various application scopes, and may require at least one defined host address identification to operate and provide services. The third party applications, as described above, cannot support applications requiring variable host address identifications, however. That is because the third party application data 108 stored in the group-based communication repository 107 has defined host address identifications, which by definition have all the information necessary to locate a network endpoint or resource. The third party application uses the same set of defined host address identifications regardless of the workspace where it operates.

To solve the need for variable host address identifications, the disclosure provided herein introduces a blueprint application and its corresponding blueprint application integrations. Further, the disclosure provided herein introduces a plurality of blueprint application integrations that may be updated so as to implement and support different versions of the blueprint application integration. In that sense, even though each of the blueprint application integrations is based on the same template, i.e. the same blueprint application, each of the blueprint application integrations is herein enabled to run different versions of the compiled code base. Each of the blueprint application integrations may further adopt settings that differ from the other blueprint application integrations in order to support the different versions of the compiled code base. In other words, the scopes, the defined host address identifications, and the enabled functional features associated with each of the blueprint application integrations may differ among the plurality of blueprint application integrations. That is the case even though each of the blueprint application integrations is generated from the same template, i.e. the same blueprint application.

In certain embodiments, to support variable host address identifications and multiple versions of blueprint application integrations, the disclosure provided herein incorporates a settings manifest file in each of the blueprint application integrations. The disclosure provided herein further implements API calls that provide access (for retrieving and modifying) to the settings manifest files. In alternative embodiments, the disclosure provided herein implements API calls that permit granular modification of specific settings of the blueprint application integrations without utilizing a settings manifest file. In this manner, the group-based communication system 105 supports applications requiring variable host address identifications, and it enables a remote system 301 to access and update the settings of the blueprint application integrations.

FIG. 6 shows an exemplary embodiment comprising a blueprint application and a plurality of blueprint application integrations. The group-based communication repository 107 stores a data structure 601 associated with a blueprint application via a blueprint application identifier. In certain embodiments, the data structure 601 that stores the data associated with the blueprint application is a relational table or row. In certain embodiments, for example, the data structure 601 may be a blueprint application row.

The blueprint application row comprises data fields that form the basis from which a group-based communication server 106 generates a plurality of blueprint application integrations. The blueprint application row stores a plurality of data values that either themselves comprise data or point to memory addresses (or storage locations) that in turn comprise data that define the blueprint application. In certain embodiments, the blueprint application row stores a name, icon, image, maximum requested scopes, maximum requested features, blueprint application identifier, and a settings manifest file 602. In certain other embodiments, the blueprint application row does not include a settings manifest file 602.

The settings manifest file 602 comprises a set of instructions in the form of machine-readable code that specify the settings of a blueprint application integration. In some embodiments, the settings manifest file is embodied as an instruction set written in JSON. However, any other scripting language or computer programming code may be used to embody the settings manifest file.

The settings manifest file 602 thus includes instructions that will define all the settings of a blueprint application integration immediately after the blueprint application integration is generated at the installation stage of the blueprint application. The settings manifest file 602 defines the available scopes, variable host address identifications, and the functional features enabled for the blueprint application integration. Because the blueprint application supports variable host address identifications, the host address identifications included in the settings manifest file 602 are also variable. In an alternative embodiment, the host address identifications included in the settings manifest file 602 are defined host address identifications which are later updated to suit the particular requirements of a blueprint application integration in a workspace.

The settings manifest file 602 may include other important values for the blueprint application integration such as a name, description of the general functionalities implemented in the blueprint application, developers information, an authentication token, and the like. An exemplary embodiment of a blueprint application integration is provided below:

```
{
  "token": "xoxa-",
  "name":"Triage Bot",
  "description":"A bot to help you triage things",
  "background_color":"#fff111",
  "collaborators":[
    "user1@corp.com",
    "user2@corp.com"
  ],
  "scopes": ["bot"],
  "slash_commands":[
    {
      "command":"/triage",
      "request_url": has variables where URLs will go,
      "description":"Triage a channel",
      "hint":""
    }
  ],
  "bot":{
    "display_name":"Triage Bot",
    "display_username":"triage_bot",
    "always_online":true
  },
```

-continued

```
      "interactive_components":]
        "request_url": has variables where URLs will go,
        "options_load_url": has variables where URLs will go
      },
      "events":{
        "workspace":[
          "message.channels"
        ],
        "bot":[
          "at_mention"
        ]
      }
    }
```

In the above code segment, the scopes field may indicate requested permissions associated with the blueprint application integration and the events field may indicate conditions and/or actions whose occurrence triggers the blueprint application integration. In some embodiments, the value assigned to the scopes field may indicate one or more object types that the blueprint application integration seeks access to, as well as one or more corresponding action types for each object type. Examples of object types include the following object types: a files object type, a search object type, a chat object type, a reaction object type, a channels object type, a do not disturb (DND) object type, an instant message (IM) object type, an emoji object type, etc. Examples of action types include read action types (including a regular read action and a bot read action), write action types (including a regular write action and a bot write action), and history access action types. Examples of scopes values may include channels:history, channels:read, channels:write, chat:write, chat:write:bot, chat:write:user, dnd:read, dnd:write, dnd:write:user, empji:read, files:read, etc. Other examples of scopes values and associated API methods are presented in the table below.

TABLE 1

| Scope Value | Associated Methods |
|---|---|
| admin.users:write | admin.users.session.reset |
| channels:history | channels.history |
|  | channels.replies |
| channels:read | channels.info |
|  | channels.list |
| channels:write | channels.archive |
|  | channels.create |
|  | channels.invite |
|  | channels.join |
|  | channels.kick |
|  | channels.leave |
|  | channels.mark |
|  | channels.rename |
|  | channels.setPurpose |
|  | channels.setTopic |
|  | channels.unarchive |
|  | conversations.join |
| chat:write:bot | chat.delete |
|  | chat.deleteScheduledMessage |
|  | chat.postEphemeral |
|  | chat.postMessage |
|  | chat.scheduleMessage |
|  | chat.update |
| chat:write:user | chat.delete |
|  | chat.deleteScheduledMessage |
|  | chat.meMessage |
|  | chat.postEphemeral |
|  | chat.postMessage |
|  | chat.scheduleMessage |
|  | chat.update |
| dnd:read | dnd.info |
|  | dnd.teamInfo |

TABLE 1-continued

| Scope Value | Associated Methods |
|---|---|
| dnd:write | dnd.endDnd |
|  | dnd.endSnooze |
|  | dnd.setSnooze |
| dnd:write:user | dnd.endDnd |
|  | dnd.endSnooze |
|  | dnd.setSnooze |
| emoji:read | emoji.list |
| files:read | files.info |
|  | files.list |
| files:write:user | files.comments.delete |
|  | files.delete |
|  | files.revokePublicURL |
|  | files.sharedPublicURL |
|  | files.upload |
| groups:history | groups.history |
|  | groups.replies |
| groups:read | groups.info |
|  | groups.list |
| groups:write | groups.archive |
|  | groups.create |
|  | groups.createChild |
|  | groups.invite |
|  | groups.kick |
|  | groups.leave |
|  | groups.mark |
|  | groups.open |
|  | groups.rename |
|  | groups.setPurpose |
|  | groups.setTopic |
|  | groups.unarchive |
| identity.basic | users.identity |
| identity.basic:user | users.identity |
| im:history | im.history |
|  | im.replies |
| im:read | im.list |
| im:write | im.close |
|  | im.mark |
|  | im.open |
| links:write | chat.unfurl |
| mpim:history | mpim.history |
|  | mpim.replies |
| mpim:read | mpim.list |
| mpim:write | mpim.close |
|  | mpim.mark |
|  | mpim.open |
| pins:read | pins.list |
| pins:write | pins.add |
|  | pms.remove |
| reactions:read | reactions.get |
|  | reactions.list |
| reactions:write | reactions.add |
|  | reactions.remove |
| reminders:read | reminders.info |
|  | reminders.list |
| reminders:read:user | reminders.info |
|  | reminders.list |
| reminders:write | reminders.add |
|  | reminders.complete |
|  | reminders.delete |
| reminders:write:user | reminders.add |
|  | reminders.complete |
|  | reminders.delete |
| search:read | search.all |
|  | search.files |
|  | search.messages |
| stars:read | stars.list |
| stars:write | stars.add |
|  | stars.remove |
| team:read | team.info |
| tokens.basic | migration.exchange |
| usergroups:read | usergroups.list |
|  | usergroups.users.list |
| usergroups:write | usergroups.create |
|  | usergroups.disable |
|  | usergroups.enable |
|  | usergroups.update |
|  | usergroups.users.update |

TABLE 1-continued

| Scope Value | Associated Methods |
| --- | --- |
| users.profile:read | team.profile.get |
|  | users.profile.get |
| users.profile:write | users.deletePhoto |
|  | users.profile.set |
|  | users.setPhoto |
| users.profile:write:user | users.profile.set |
| users:read | bots.info |
|  | users.getPresence |
|  | users.info |
|  | users.list |
| users:read.email | users.lookupByEmail |
| users:write | users.setActive |
|  | users.setPresence |

With reference to FIG. 6, a group-based communication repository 107 also stores a plurality of data structures 603A-603N that define blueprint application integrations 1-N. The group-based communication server 106 generates the plurality of blueprint application integrations 1-N based on the data structure 601 that define a blueprint application. To do so, the group-based communication server 106 accesses the data structure 601 that define a blueprint application, replicates the data stored therein, and generates, based on the replicated data, the data structures 603A-603N that define blueprint application integrations 1-N. Even though each of the blueprint application integration data structures 603A-603N is generated from the blueprint application data structure 601, the blueprint application integration data structures 603A-603N include additional information to support the operation of each blueprint application integration in a workspace. Thus, the data structures 603A-603N differ and are distinct from data structure 601. At least, for example, the data structures 603A-603N differ after a remote systems 301 make API calls to update or modify the settings of the blueprint application integrations associated with data structures 603A-603N.

In certain embodiments, the data structures 603A-603N comprise blueprint application integration rows. Each of the blueprint application integration rows holds at least one or more host address identifications that may be configured either as variable host address identifications or defined host address identifications. For example, shortly after a blueprint application integration is installed in a workspace and before the blueprint application integration is fully configured and updated by a remote system, the blueprint application integration row stores variable host address identifications. When the remote system makes an API call to update the blueprint application integration, the at least one variable host address identification stored in the blueprint application integration row is transformed into a defined host address identification.

In addition to the host address identifications, a blueprint application integration row stores other values that define the functional features that the blueprint application integration has permission to implement, the functional features that the blueprint application actually implements, the maximum scopes granted to the blueprint application integration, a blueprint application integration identifier, a blueprint application identifier, a blueprint application integration credentials set including an authentication token.

The functional features that a blueprint application integration may implement may be similar to the functional features already discussed in the context of the third party application and will thus not be described in detail in this section. A blueprint application integration may implement one or more slash commands, incoming webhooks, interactive components, event subscriptions, OAuth processes, bot users, and many other functional features not expressly described herein. The main difference between a third party application and a blueprint application integration with regards to these functional features lies in the host address identifications. On one hand, a third party application may require that, regardless of the workspace within which the third party application operates, the group-based communication server 106 send a payload object to the same set of one or more defined host address identification. On the other hand, a blueprint application may be configured to require that, depending on the workspace where the blueprint application is installed (i.e. depending on the blueprint application integration in question), the group-based communication server 106 send a payload object to a different set of one or more defined host address identifications.

When a user or administrator first submits a request to install a blueprint application in a workspace, the group-based communication server 106 is configured to request permission for certain scopes and functional features for the blueprint application integration (i.e. the installed instance of the blueprint application in a workspace). The group-based communication server 106 thus enables the user or administrator to define the set of maximum scopes and functional features that a blueprint application integration may have in said workspace. This gives the user or administrator control over the types of actions that the blueprint application integration may take within the workspace where the blueprint application integration is installed. The blueprint application integration may thus implement functional features and has permission to perform actions within a workspace as long as the functional features and the actions fall within the maximum scopes and functional features defined by the user or administrator. Accordingly, the blueprint application integration row stores values that define these maximum scopes and maximum functional features associated with the blueprint application integration.

In some embodiments, a request for permissions related to certain scopes and functional features for the blueprint application integration may be performed in response to a request to define one or more integration parameters for the blueprint application instead of and/or in addition to a request to install the blueprint application. In some embodiments, the request to install a blueprint application and/or the request to define the one or more integration parameters for the blueprint application may be performed by accessing a URL associated with such a request to install and/or request to define the one or more integration parameters. The URL call and/or the HTTP request associated with the URL call may be associated with one or more parameters, such as at least one of an application identifier for the blueprint application, a definition of scopes associated with the requested blueprint application integration, a group-based communication interface identifier associated with a group-based communication interface associated with the blueprint application integration, and a state identifier that may be returned as part of an authentication token for the blueprint application integration in order to enable a third party application provider associated with the blueprint application to verify authenticity of the blueprint application integration.

The blueprint application integration row also stores an authentication token which can be used to authenticate the identity of a blueprint application integration as it operates in a workspace and as it communicates with the group-based communication system 105 and external resources such as remote system 301. For example, in one embodiment, the group-based communication server 106, in response to receiving a user request to install a blueprint application, initiates an authorization procedure to generate an authentication token for the corresponding blueprint application integration. An example authorization procedure comprises OAuth 1.0 or 2.0. OAuth allows a user to authorize the blueprint application integration to access specific resources associated with a user account. To be more specific, the user account is associated with a group identifier that is common between the user account and a workspace, and the workspace has various resources such as group-based communication objects associated to it also via a common group identifier. Using OAuth, the group-based communication system 105 enables the user to grant access to specific resources in a workspace, such as group-based communication objects, that the user also as access to. Once the blueprint application integration has authorization from a user to access certain resources, then the external application may, for example, access the requested resource without having to access the user account or log into the group-based communication system 105 as the user. In certain embodiments, the group-based communication server 106 uses an OAuth authorization procedure to generate the authentication token, which the blueprint application integration may use to gain access to workspace resources.

In some embodiments, the authentication token may be provided as part of a JavaScript Object Notation (JSON) file or other suitable data structure. In some embodiments, the data structure containing the authentication token may also include indications of one or more defined scopes and features for the blueprint application integration. In some embodiments, the data structure containing the authentication token may have a format corresponding to the example code segment provided below.

```
{
    "access_token": "xoxp-23984754863-2348975623103", //authentication token
    "scope": "read" //defined scopes and features
}
```

In some embodiments, if the blueprint application is associated with one or more automated activity profiles (e.g., one or more bot profiles), the data structure containing the authentication token for an automated activity profile may have a format corresponding to the example code segment provided below.

In certain embodiments, the blueprint application integration rows also store a manifest file. The settings manifest file is similar to the settings manifest file 602 already discussed in the context of the blueprint application and data structure 601. A main difference between the settings manifest file stored in a blueprint application integration row and a settings manifest file 602 is that the blueprint application integration row, in some embodiments, may store defined host address identifications. To provide additional context, when a blueprint application integration row is first generated and stored at installation, the group-based communication server 106 replicates and stores therein the settings manifest file 602 from the blueprint application. At that time, the two settings manifest files contain the same information. At a later time, however, a remote system 301 may make an API call which causes the group-based communication server 106 to modify the settings manifest file associated with a blueprint application integration row. The API call may, for example, replace the variable host address identifications with defined host address identifications in the settings manifest file. After such an API call, the settings manifest file stored in a blueprint application integration row differs from the settings manifest file 602 associated with a blueprint application.

In an embodiment where data structure 601 does not include a settings manifest file, when a blueprint application integration row is first generated and stored at installation, but before the blueprint application integration is updated, the group-based communication server 106 configures the blueprint application row to include a placeholder for the settings manifest file. In certain embodiments, the placeholder for the settings manifest file is an empty settings manifest file (i.e. a file with no instructions stored therein). At a later time, a remote system 301 may make an API call which causes the group-based communication server 106 to modify the settings manifest file associated with a blueprint application integration row. The API call may, for example, populate the settings manifest file with defined address identifications, scopes, and enabled functional features for the blueprint application integration.

An exemplary embodiment of a settings manifest file associated with a blueprint application integration is reproduced below. This exemplary embodiment comprises defined host address identifications (e.g., within the "request_url" field).

```
{
"access_token": "xoxp-XXXXXXXX-XXXXXXXX-XXXXX", //authenication token
"scope": "incoming-webhook,commands,bot", //defined scopes and features
"team_name": "Team Installing Your Hook", //group-based communication interface name
"team_id": "XXXXXXXXXX", //group-based communication interface identifier
"incoming_webhook": { //webhook information
"url": "https://hooks.slack.com/TXXXXX/BXXXXX/XXXXXXXXXX",
"channel": "#channel-it-will-post-to",
"configuration_url": "https://teamname.slack.com/services/BXXXXX"
},
"bot":{ //bot access token information
"bot_user_id": "UTTTTTTTTTTR",
"bot_access_token":"xoxb-XXXXXXXXXXXXX-TTTTTTTTTTTTTT"
}
```

```
{
    "token": "xoxa-",
    "name":"Triage Bot",
    "description":"A bot to help you triage things",
    "background_color":"#fff111",
    "collaborators":[
        "user1@corp.com",
        "user2@corp.com"
    ],
    "scopes": ["bot"],
    "slash_commands":[
        {
            "command":"/triage",
            "request_url":"https://example.com/triage",
            //may contain host address
                identifications for both slash commands and
                interactive components
            "description"/"Triage a channel",
            "hint":""
        }
    ],
    "bot":{
        "display_name":"Triage Bot",
        "display_username":"triage_bot",
        "always_online":true
    },
    "interactive_components":{
        "request_url":"https://example.com/events",
        "options_load_url":"https://example.com/menus"
    },
    "events":{
        "workspace":[
            "message.channels"
        ],
        "bot":[
            "at_mention"
        ]
    }
}
```

Returning to FIG. 6, just like a third party application comprises at least two elements (see e.g. FIG. 3, element 310), a blueprint application integration also comprises at least two elements: machine-readable code at a remote system and blueprint application integration data as stored in data structures such as 603A-N. FIG. 6 thus shows remote systems 301A-301N which are analogous to remote system 301 shown in FIGS. 3A and 4. For example, each of remote servers 306A-N may be embodied as a remote server 306 and each of remote repositories 307A-N may be embodied as remote repository 307.

Remote systems 301A-N may be embodied by a third party application provider such as 102A-102N, a client device such as 101A-101D, or some other remotely located computing system. Further, remote servers 306A-306D may be embodied by one or more computing systems such as apparatus 400 shown in FIG. 4. The apparatus 400 may include a processor 402, a memory 401, input/output circuitry 403, communications circuitry 405, remote repository 307, and remote communication circuitry.

Returning to FIG. 6, the remote repositories 307A-307D store therein compiled code bases 308A-308N, which comprise App Code 1-App Code N in FIG. 6. The compiled code bases 308A-308N comprises machine-readable code that, when executed by each of the remote servers 306A-306N, configures each of the remote servers 306A-306N to execute processes that support the operation of the blueprint application integrations 1-N. Each of the blueprint application integrations 1-N comprises one of compiled code bases 308A-308N as well as one of the blueprint application integration data stored at the group-based communication repository 107, which is separate from the remote systems 301A-301N. More specifically, blueprint application integration 1 comprises the compiled code base 308A and the blueprint application integration data corresponding stored in data structure 603A. Blueprint application integration 2 comprises the compiled code base 308B and the blueprint application integration data corresponding stored in data structure 603B. And blueprint application integration N similarly comprises the compiled code base 308N and the blueprint application integration data corresponding stored in data structure 603N. In other embodiments, a single blueprint application integration may comprise more than one compiled code base stored at more than one remote repository. In these embodiments, each of the remote repositories may additionally be distributed among a plurality of remote systems such as remote systems 301A-301N.

Returning to the embodiment depicted in FIG. 6, remote servers 306A-306N thus provide for receiving of electronic data from various sources, including but not limited to the group-based communication system 105. For example, the remote servers 306A-306N may be operable to receive and transmit payload objects from and to the group-based communication system 105. The remote servers 306A-306N are configured to send and receive the payload objects through the communications network 104 (not shown).

In certain embodiments, the remote servers 306A-306N are configured to communicate with the group-based communication system 105 through one or more application program interfaces (APIs). The APIs implemented by the group-based communication system 105 enable remote systems 301A-301N to interact, and sometimes even modify, the blueprint application integrations 1-N. A simplified representation of the communications enabled by the APIs are represented by items 620, 621, and 622 in FIG. 6. In embodiments, items 620, 621, and 622 may not represent a direct communication link between the remote systems 301A-301N and the corresponding blueprint application integrations 1-N. Instead, items 620, 621, and 622 show that remote systems 301A-301N may interact and, in certain embodiments, gain access and modify the blueprint applications integrations 1-N by means of a communications network 104 and the APIs implemented by the group-based communication system 105.

Remote servers 306A-306N may send payload objects to network endpoints defined by host address identifications. These network endpoints are locations where the group-based communication system 105 is configured to receive payload objects comprising data associated with functions of the blueprint application integrations. The group-based communication system 105 may thus be configured to utilize the payload object sent by the remote servers 306A-306N in order to execute actions associated with blueprint application integrations. Similarly, the remote servers 306A-306N may receive payload objects at network endpoints that are definable by host address identifications. The received payload objects comprise information related to processes associated with the blueprint application integrations 1-N. In these embodiments, the remote servers 306A-306N, in response to receiving the payload objects from the group-based communication system 105, are configured to execute certain actions in association with their corresponding blueprint application integration.

The blueprint application integration data comprising the defined host address identifications comprises information regarding the locations to which the group-based communication system 105 may send a payload object as part of the operations implemented by the blueprint application integration in a workspace. The host address identifications, in certain embodiments, are network endpoint or resources that are configured to accept and process payload objects in order to provide the services associated with a blueprint application integration.

The previous discussion regarding FIG. 5 in the context of a third party application is equally relevant in the context of the blueprint application integrations of FIG. 6. In other words, in the context of FIG. 5, this disclosure discussed that a third party application may implement a slash command, which requires certain payload objects to be exchanged between a client device, a group-based communication system 105 and a remote system 301. Here too, in the context of FIG. 6, a blueprint application integration may implement such a slash command. The difference here is that each of the blueprint application integrations 1-N may have a different set of defined host address identifications stored in its corresponding blueprint application integration row. Consequently, each of the blueprint application integrations 1-N would cause the group-based communication server 106 to establish a communication link with a different network endpoint, which may be hosted by a different remote system.

By way of example, provided herein is an exemplary embodiment comprising a blueprint application integration 1 implementing the same slash command functionality that was previously described in the context of FIGS. 4 and 5. In this particular exemplary embodiment, the slash command associated with blueprint application integration 1 is invoked when a user of the group-based communication system 105 submits the input message "/weather 94901" to a channel where the blueprint application integration 1 is installed. If the same input message is posted in a channel belonging to a workspace where blueprint application integration 1 is not installed, then the slash command functionality associated with blueprint application integration 1 is not invoked. The steps for invoking a slash command are similar to those steps already described in the context of the third party application of FIGS. 3 and 5.

In the circumstances where the slash command associated with the blueprint application integration 1 is invoked, the group-based communication server 106 determines the correct URL (i.e. a defined host address identification) identification the network endpoint to which it may send a request message associated with the slash command. The correct URL is stored in the data structure 603A that stores the data corresponding to blueprint application integration 1.

After determining the correct URL, the group-based communication server 106 sends, to the network endpoint specified by the URL, a payload object comprising the slash command that user John Smith invoked. An exemplary, non-limiting embodiment of the data comprising the payload object associated with the slash command, "/weather 94901," is provided below.

```
token=gIkuvaNzQIHg97ATvDxqgjtO
group_id=T0001
team_domain=example
channel_id=C2147483705
channel_name=test
user_id=U2147483697
user_name=Steve
command=/weather
text=94901
response_url=https://hooks.slack.com/commands/1234/5678
```

In the context of FIG. 6, the group-based communication server 106 sends the payload object associated with the slash command "/weather 94901" to a URL hosted by remote system 301A. The URL, which is stored in the group-based communication repository 107 as part of the blueprint application integration data, specifies the network location of the network endpoint or resource where the remote system 301A is configured to receive the payload object associated with the slash command "/weather 94901."

Remote system 301A is configured to process the payload object to support/implement the operations and services rendered by blueprint application integration 1. In response to receiving the payload object, the remote server 306A first validates the data received in the payload object by confirming that the authentication token (received with the payload object) matches an authentication token previously received by the group-based communication server 106. In some embodiments, the authentication token is stored in the remote repository 307A. In certain embodiments, the group-based communication server 106 generates and sends, to the remote servers 306A-306N, authentication tokens shortly after blueprint application integrations 1-N are installed in their corresponding workspaces. The authentication tokens are unique to each of the blueprint application integrations. Because a blueprint application integration is limited to one workspace only, then each authentication token is also unique to a workspace. In addition, during the validation step, the remote server 306A may also validate the group identifier received with the payload object. In some embodiments, group identifiers are also stored in the remote repository 307A In some embodiments, a blueprint application may require a user to periodically perform integration authorization, which in turn may lead to generating new authentication tokens for the blueprint application.

In a circumstance where the remote server 306A determines that the token received as part of the payload object does not match what is stored in the remote repository 307 for blueprint application integration 1, the remote server 306A returns an error message and performs no further actions. Similarly, if the group identifier and third party application identifier received with the payload object do not match the group identifier associated with blueprint application integration identifier as stored in the remote repository 307A, the remote server 306A returns an error message and performs no further actions.

On the other hand, if the remote server 306A successfully validates the payload object, the remote server 306A proceeds with the proper action as defined in the compiled code base 308A. In the example embodiment of FIG. 6, the remote server 306A generates a payload object as a response to the slash command. Then, the remote server 306A transmits the response payload object to the group-based communication system 105. The remote server 306A sends the payload object to the response URL specified in the received payload object, i.e. response_url=https://hooks.slack.com/commands/1234/5678. An exemplary embodiment of the data comprising the response payload object associated with the "/weather 94901" command is reproduced below.

```
{
    "response_type": "in_channel",
    "text": "It's 80 degrees right now.",
    "attachments": [
        {
            "text":"Partly cloudy today and tomorrow"
        }
    ]
}
```

In some embodiment, the response_type field within the above code segment may indicate whether all user profiles associated with the group-based communication channel should have access to a response associated with the response payload object. In some embodiments, the response_type field may take a first value (e.g., an in_channel value) which indicates that all user profiles associated with a group-based communication channel will have access to the response associated with the response payload object and a second value which indicates that only an author user of the response will have access to the response associated with the response payload object.

In response to receiving the response payload object at the correct URL and within a pre-determined period of time (for example, 3000 milliseconds), the group-based communication server 106 parses the payload object to determine the proper action to execute. In this particular embodiment, the group-based communication server 106 determines that the response payload object comprises a message to be posted in a specific group-based communication channel, and the message includes the text "It's 80 degrees right now. Partly cloudy today and tomorrow." Thus, the group-based communication server 106 causes the group-based communication repository 107 to associate the message with the specific group-based communication channel, and then sends a payload object to the client device. The payload object is configured to cause the client device to render the newly posted message that the blueprint application integration generated as a result of the user invoking the slash command. The resulting message is similar to that already shown in FIG. 5, item 520, which shows the resulting message from invoking the slash command.

In embodiments, the blueprint application integration data stored in data structure 603A comprises information defining the proper functional features, URLs, and scopes to enable the blueprint application integration 1 to carry out the operations associated with the slash command. In embodiments, the blueprint application integration 1 comprises app features specifying that the blueprint application integration 1 includes a slash command that may be invoked when a user provides an input comprising "/weather 94901." The blueprint application integration 1 comprises application scopes specifying that the blueprint application integration 1 may read and post messages in the specific group-based communication channel where the slash command was invoked. Finally, as previously discussed, the blueprint application integration 1 comprises at least one defined host address identification in the form of a URL, which is the location where the group-based communication server 106 may send a payload object after a user invokes the slash command.

It will be appreciated that the discussion of blueprint application integration 1 and the slash command "/weather 94901," are merely illustrative. A blueprint application integration may include additional functional features. For example, a blueprint application integration may, in addition to a slash command, include one or more incoming webhooks, interactive components, event subscriptions, OAuth processes, a bot user, and many other functional features not expressly described herein.

In embodiments, each of the blueprint applications integrations 1-N may also implement the same slash command functionality. In embodiments, each of the blueprint applications integrations 1-N may cause the group-based communication server 106 to send payload objects to different network endpoints after the slash command is invoked in the corresponding workspaces. Further, the different network endpoints may be hosted by different remote systems. For example, a slash command invoked in a group-based communication channel where blueprint application integration 2 is installed would cause the group-based communication server 106 to send a payload object to a network endpoint hosted by remote system 2. A slash command invoked in a group-based communication channel where blueprint application N is installed would cause the group-based communication server 106 to send a payload object to a network endpoint hosted by remote system N. Consequently, the blueprint application and the blueprint application integrations support variable host address identifications. That is, the defined host address identifications are configurable at a time subsequent to the installation of the blueprint application integration in a workspace.

Installing a Blueprint Application

Blueprint applications may become publicly available to a plurality of users of the group-based communication system 105. In embodiments, the group-based communication system 105 may include blueprint applications in a directory of third party applications (the "App Directory") that are available for users. Thus, users of the group-based communication system 105 may access the App Directory to browse third party applications, including blueprint applications, and select at least one of a plurality of these applications for installation in one or more workspaces with which the user is associated.

In one embodiment, a user of a client device 101A (note that even though this discussion refers to client device 101A, this discussion is equally applicable to any of client devices 101A-N) may view an interactive app directory listing interface such that depicted in FIG. 7. The client device 101A is thus configured to render the interactive app directory listing interface for viewing. As shown in FIG. 7, the interactive app directory listing interface provides information regarding the third party application. The interactive app directory listing also enables installation of the third party application onto a workspace. To that end, the user of client device 101A may activate actuator button 701, which causes the client device 101A to send an installation request to the group-based communication server 106. In some embodiments, the group-based communication system 105 may require a log in by user of client device 101A before the user may activate actuator button 701. In this manner, the installation request that the group-based communication server 106 receives comprises an indication regarding the workspaces to which the requesting user belongs and a third party identifier (or blueprint application identifier) for the third party application (or blueprint application) that is to be installed. In certain embodiments, workspaces are associated with group identifiers that uniquely identify each of the workspaces of the group-based communication system 105. A group identifier could be used as the indication regarding the workspaces to which the requesting user belongs. As a result of receiving the installation request, the group-based communication server 106 has all the necessary information to identify the workspace where the third party application (or blueprint application) is to be installed.

If the group-based communication server 106 determines that the third party application associated with the installation request is a blueprint application, group-based communication server 106 starts a method 8000 for installing a blueprint application in the group-based communication system 105. With reference to FIG. 8, which shows a flowchart of an example method 800 for installing a blueprint application, at 8100, the group-based communication server 106 receives an installation request generated as a result of a user input indicating that a user requests that a blueprint application integration be installed. The installation request comprises a request to install the blueprint application in a workspace. The installation request corresponds to the request generated by client device 101A upon activation of actuator button 701.

At 8200, the group-based communication server 106, in response to receiving the installation request, generates and transmits scope and features request interface data configured to cause a client device to render an interactive scopes and features request interface, the interactive scopes and features request interface is configured to enable user authorization of defined scopes and features for the blueprint application integration. For example, FIG. 9 shows an interface 9000 which is an exemplary embodiment of an interactive app installation interface. As shown, the interactive app creation interface may provide information regarding the blueprint application. For example, interface 9000 shows the name of the blueprint application ("Super Service") the name of the workspace where the blueprint application will be installed ("My Test Company"), and a list of scopes requested for the blueprint application integration that will be generated upon installation. For the scopes requested, the group-based communication server 106 may request, on behalf of the blueprint application integration, any type of action that is supported by the group-based communication system 105. Some potential actions may include, for example and without limitation, adding messages to public group-based communication channels in the test workspace, creating files in the test workspace, posting emojis to private group-based communication channels, modifying attributes in user accounts associated with the test workspace, reading and processing data posted in a specific group-based communication channel, modifying files posted in a plurality of group-based communication channels, adding bot users to workspaces and/or group-based communication channels, and the like.

Interface 9000 also enables user authorization of a set of minimum requested scopes 902 and functional features 903 for the blueprint application integration that will result from the installation of the blueprint application in a workspace. Additionally, interface 9000 enables user selection and authorization of a subset of maximum requested scopes 904 and maximum functional features 905 for the blueprint application integration. Interface 9000 enables user selection of the subset via interactive buttons 906 and 907, which indicate the user selections of the scopes and features comprising the maximum requested scopes 904 and features 905.

The group-based communication server 106 determines minimum requested scopes 902 and features 903 as well as the maximum requested scopes 904 and features 905 based on the data stored in the blueprint application row that is stored in the group-based communication repository 107 and that is associated with the blueprint application being installed. Consequently, the scope and features request interface data comprises these minimum and maximum scopes and features so as to cause the client device to render an interactive scopes and features request interface such as that shown in FIG. 9.

Actuator button 901 enables the user of client device 101A to authorize the permissions for the third party application. Thus, if the user of client device 101A activates actuator button 901, the client device 101A generates a permission authorization and a maximum scopes and features definition object. The permission authorization comprises an indication that a user has authorized the installation of the blueprint application in a workspace. The maximum scopes and features definition object comprises information regarding the workspace where the blueprint application is to be installed, the scopes to be associated with the blueprint application integration that will result from the installation of the blueprint application, the functional features associated with the same, and any other data necessary for the implementation of the permissions granted to the blueprint application integration. For example, depending on the permissions authorized, the maximum scopes and features definition object may include channel identifiers to which the blueprint application integration has been granted permissions, user identifiers, group identifiers, and the like. After generating the permission authorization and the maximum scopes and features definition object, the client device 101A sends these objects to the group-based communication server 106.

In embodiments, only one object might be used at this step, such that the object would indicate both that the user has authorized installation of the third party application and/or the maximum scopes and features definitions related to the permission(s) granted to the blueprint application integration. In embodiments, the specific form of the message authorizing installation and specifying the permissions may be embodied via other techniques.

At 8300, the group-based communication server 106 receives a maximum scope and feature definition object as well as a permission authorization from the client device 101A. In some embodiments, in response to receiving the maximum scope and feature definition object and permission authorization, the group-based communication server 106 temporarily stores data comprising the user permissions granted to the third party application. The group-based communication server 106 may subsequently use the data comprising the permissions to record such permissions in a blueprint application integration row, which is further discussed in the context of step 8600 below. In other embodiments, the group-based communication server 106 may generate and store a blueprint application integration row in response to receiving the user scope definition object and permission authorization at step 8300. Further, this blueprint application integration row includes the permissions associated with the installation of the blueprint application as defined by the maximum scope and features definition object and permission authorization received at 8300.

In response, at 8400, the group-based communication server 106 generates and transmits, a credentials set associated with the blueprint application identifier. The credentials set comprises at least an authentication token that may be used to authenticate payload objects and communications related to the blueprint application integration.

In some embodiments, at 8500 and after generating the credentials set, the group-based communication server 106 generates and transmits, to the client device, a token transmission payload object. The token transmission payload object comprises token transmission data configured to cause the client device to render a display comprising the credentials set, including the authentication token that was generated for the blueprint application integration. In addition, the token transmission data may be configured to cause the client device to render a display that includes instructions regarding how to utilize the credentials set. There, the user of client device 101A is instructed to provide the credentials set to a remote system such as a third party application provider. In this manner, the third party application provider is able to support the operations of the blueprint application integration within the group-based communication system 105. For example, in one embodiment, the third party application provider may include the credentials set as part of communication messages sent to the group-based communication server 106. Such communication messages may be necessary to send data, to the group-based communication server 106, which the third party application requires for its proper operation. Similarly, the third party application provider may send, to the group-based communication server 106, communication messages to request and retrieve information from the group-based communication system 105. Again, the retrieved information may be needed for the proper functioning of the third party application.

By including the credentials set with communication messages, the third party application provider and the group-based communication server 106 may secure the communications. For example, the credentials set may be utilized by the third party application provider and the group-based communication server 106 to authenticate the identity of the source of received communications.

In an alternative embodiment, instead of instructing the user of client device 101A to navigate to an external network endpoint to provide the credentials set, the group-based communication server 106 automates the process by re-directing the user of client device 101A to the proper network endpoint where the user of client device 101A is to provide the credentials set. Alternatively, in another embodiment, the group-based communication server 106 establishes a communication link with the proper network endpoint and sends the credentials set as a payload object. To support these alternative functionalities, the installing user would necessarily have to provide the defined host address identifications that fully define the network the external network endpoints for providing the credentials set and/or establishing a communication link for purposes of providing a credentials set to a remote system such as a third party application provider.

Of note is the credentials set generated at step 8400. At this stage (i.e. at step 8400), because the defined host address identifiers are unknown (because they have not been provided prior to step 8400), the group-based communication server 106 may execute an authentication procedure with itself in order to generate tokens that usually are generated during an authentication procedure. For example, the authentication tokens are normally generated via an authentication procedure such as OAuth 1.0 or 2.0. During third party application installations for third party applications that do not require variable host addresses, the group-based communication server 106 executes an OAuth procedure with a third party application provider in order to generate the necessary tokens. However, for a blueprint application, such an OAuth procedure with a third party application is not possible because the host addresses are not known before step 8400.

In embodiments, one solution to the problem of not knowing the host address identifications for an OAuth procedure includes the group-based communication server 106 sending an OAuth request to itself and following the remainder of an OAuth procedure by responding to itself and emulating the actions that a third party application provider would otherwise execute. In this manner, the group-based communication server 106 is able to generate the authorization token provided via the interactive host address request interface.

At 8500, the group-based communication server generates a blueprint application integration row comprising a plurality of integration row entries. To carry out this step, and in certain embodiments, the group-based communication server 106 first retrieves, from the group-based communication repository 107, the blueprint application row associated with the blueprint application. The group-based communication server 106 then replicates the blueprint application row and adds new row elements that further define a blueprint application integration. Thus, after this step, the blueprint application integration stores at least a group identifier (corresponding to the workspace where the third party application is being installed), a blueprint application identifier, a blueprint application integration identifier, the maximum granted scopes as defined by the maximum scope and feature definition object, the maximum granted functional features as defined by the same, the authentication token, enabled functional features, one or more variable host address identifications, a settings manifest file, and the like.

In embodiments, some of the functions described in the context of steps 8400 and 8500 may take place in an alternative order. For example, the group-based communication system 105 may, in an alternate embodiment, first generate and store the blueprint application integration row and then transmit a token transmission payload object.

In at least one embodiment, after generating the blueprint application integration row, the group-based communication server 106 generates data containing the configuration details of the blueprint application that was installed, and then accesses the group-based communication repository 107 to store the data in additional data structures. For example, the group-based communication server 106 causes the group-based communication repository 107 to include one relational table or row for each of the following features, functions, or elements of the blueprint application integration: a third party application row specifying the permissions associated with the blueprint application integration and its authorization token (among other things, this row would associate blueprint application integration—via its blueprint application integration identifier—with a workspace—via a group identifier—to capture the relationship between the blueprint application integration, the workspace, and the blueprint application integration's permissions within that workspace), a bot row providing details for a bot functionality associated with the blueprint application integration including a bot token (the token may be used to authenticate the identity of the bot when it performs actions within the group-based communication system 105 or with external entities such as a third party application provider) an incoming-webhook row providing details regarding incoming messages including channel identifiers where the messages are to be posted, a slash command row providing details regarding a slash command including a location where a notification of a command invocation is to be sent, a subscription row providing details of a subscription to a specific event or events that may occur in the group-based communication system, and an interactive component row providing details of an implementation of an interactive button.

In embodiments, the integration of a blueprint application may include more than one of each of the aforementioned features. For example, a particular implementation of a blueprint application may implement two or more interactive buttons, two or more event subscriptions, two or more commands, and so on. In such an embodiment, the group-based communication repository 107 would include a row for each of these implemented features.

In embodiments, the aforementioned rows may be included in a single table storing a blueprint application integration identifier therein or that the aforementioned may be distributed on more than one table or in a plurality of tables. For example, in one such embodiment, a separate table includes all the rows comprising the implementation details for all incoming webhooks for all blueprint application integrations. Similarly, a separate table may include all the implementation details for all slash commands for blueprint application integrations. And so on. Thus, in this embodiment, each table row of each table (i.e. the tables including all implementation details for the incoming webhooks, slash commands, interactive buttons, bot users, and the like) includes a blueprint application integration identifier and an authentication token which jointly identify a corresponding blueprint application integration.

Method 8000 is complete at 8700, and results in a blueprint application integration.

Application Settings API with Settings Manifest File

The group-based communication system 105 provides means for updating or configuring each of the blueprint application integrations after they are installed in a workspace. The need for updating blueprint application integrations exists because the functionalities associated with blueprint applications may need to be updated over time. For example, the need may arise when a third party application provider develops new features, functionalities, services, or addresses bugs in prior versions of the blueprint applications. Because prior versions of the blueprint applications would have already been installed in a plurality of workspaces, one possible solution for updating the blueprint applications in the group-based communication system 105 is by deleting all prior versions of the blueprint application integrations and then requesting that users reinstall the blueprint applications in their corresponding workspaces. However, this solution is impractical for various reasons. For example, users would have to go through an installation request and an authentication process each time that the blueprint applications are reinstalled. Additionally, files associated with the blueprint applications may be lost, or at the very least retaining files during the reinstallation process would create another problem to be solved. In general, the solution of deleting prior versions of blueprint application integrations and reinstalling a blueprint application every time that the blueprint application is updated is impractical.

Accordingly, the disclosure provided herein incorporates an Application Settings API that enables external client devices to update and configure the settings of blueprint application integrations that have been already installed in workspaces of the group-based communication system 105.

In certain embodiments, the Application Settings API comprises a network endpoint or resource hosted by the group-based communication system 105. The Application Settings API network endpoint comprises two different methods: an integration information method and an integration update method.

The integration information method returns, in response to receiving a request payload object, a settings manifest file that describes the current settings of a blueprint application integration. To trigger such a response from the group-based communication server 106, the request payload object received at the Application Settings API network endpoint may identify the method being invoked (i.e. the integration information method), the blueprint application identifier corresponding to the blueprint application integration from which the settings manifest file is being sought, the authentication token corresponding to the blueprint application integration from which the settings manifest file is being sought. Optionally, the request payload object may include additional data such as a group identifier corresponding to the workspace where the blueprint application integration is installed, a blueprint application identifier that identifies the blueprint application from which the blueprint application integration was generated, a name of the blueprint application from which the blueprint application integration was generated, additional credentials associated with the blueprint application integration, a defined host address identification corresponding to a location where a response payload object should be sent, and the like.

In certain embodiments, however, the payload object does not need to specify the method being invoked. Instead, the defined host address identification that specifies where the request payload object is transmitted includes enough information to specify the method being invoked. For example, in at least one embodiment, the Application Settings API network endpoint includes two methods hosted at two different locations of the Application Settings API network endpoint. In certain embodiments, and as an exemplary and non-limiting embodiment, the Application Settings API network endpoint may be fully identifiable via a defined host address identification that takes the form "https://Group-Based-Communication-System.com/api/." The Application Settings API network endpoint further has two endpoints, where each endpoint is associated with a different method. For example, the defined host address identification "https://Group-Based-Communication-System.com/api/app.info" comprises the location at the Application Settings API network endpoint where the integration information method is supported. That is, any payload objects received at said network endpoint causes the group-based communication server 106 to treat the payload object as a request invoking the integration information method. On the other hand, the defined host address identification "https://Group-Based-Communication-System.com/api/app.update" comprises the location at the Application Settings API network endpoint where the integration update method is supported. That is, any payload object received at this network endpoint causes the group-based communication server 106 to treat the payload object as a request invoking the integration update method.

The integration update method accepts payload objects that comprise a settings manifest file that, in turn, comprises instructions in the form of code that define the settings of a blueprint application integration. As part of the integration update endpoint method, the group-based communication server 106 is configured to retrieve, form the group-based communication repository 107, the data structure 603A-603N storing the blueprint application integration data corresponding to the authentication token included with the payload object. The group-based communication server 106 is configured to then determine the differences between the settings manifest file stored in the corresponding data structure of the blueprint application integration and the settings manifest file received with the payload object. The group-based communication server 106 then updates or modifies the settings manifest file associated with the blueprint application integration. The group-based communication server 106 thus ensures that the data structure storing the blueprint application integration data includes a settings manifest file that matches the settings manifest file received as part of the payload object.

To trigger the group-based communication server 106 to execute the functions associated with the integration update method, the request payload object received at "https://Group-Based-Communication-System.com/api/app.update" may define the blueprint application identifier corresponding to the blueprint application integration that the group-based communication server 106 may update and the authentication token corresponding to the blueprint application integration from which the settings manifest file is being sought. Optionally, the request payload object may include additional data such as a group identifier corresponding to the workspace where the blueprint application integration is installed, a blueprint application identifier that identifies the blueprint application from which the blueprint application integration was generated, a name of the blueprint application from which the blueprint application integration was generated, additional credentials associated with the blueprint application integration, a defined host address identification corresponding to a location where a response payload object should be sent and the like.

In this manner, the Application Settings API enables remote systems 301A-301N to configure the settings of their corresponding blueprint application integrations 1-N. In other words, each of remote systems 301A-301N has blueprint application integration data stored in their respective remote repositories 307A-307N. Each of remote systems 301A-301N is thus configured to transmit payload objects to the Application Settings API network endpoint(s) to either retrieve the current settings of a blueprint application integrations 1-N or to update the settings of a blueprint application integration 1-N. Each of remote systems 301A-301N, however, may include in the payload object information that uniquely and securely identifies a blueprint application integration.

To provide further clarity, FIG. 10, which is an exemplary flowchart of a method 10000 for retrieving a settings manifest file from the group-based communication system 105 will now be discussed. In this embodiment, a remote system like remote system 301A of FIG. 6 may send to the defined host address "https://Group-Based-Communication-System.com/api/app.info" a request payload object that comprises a blueprint application identifier, the authentication token corresponding to such blueprint application identifier as reflected in remote repository 307A, and a defined host address identification corresponding to a location where a response request payload object should be sent. At 10100, the group-based communication server 106 receives the request payload object from a remote system 301A.

At 10200, the group-based communication server 106, in response to receiving such a request payload object, first validates the request payload object. To do so, in certain embodiments, the group-based communication server 106 retrieves the data structure storing the blueprint application integration associated with the received blueprint application identifier. The group-based communication server 106 then compares the authentication token received as part of the request payload object with the authentication token stored in the retrieved data structure. If the authentication tokens match, then the group-based communication server 106 validates the communication. If the authentication tokens do not match, the group-based communication server 106 then advances to step 10550 where the group-based communication server 106 generates a response payload object comprising an error message. The group-based communication server 106 then transmits the response payload object to the defined host address identification received as part of the request payload object.

Accordingly the authentication tokens are meant to be kept secret by the group-based communication system 105 and the remote systems 301A-301N. These authentication tokens are used as a security measure to make sure that only authorized entities request and update blueprint application integrations.

In circumstances where the group-based communication server 106 validates a request payload object received at the defined host address "https://Group-Based-Communication-System.com/api/app.info," the group-based communication server 106 then advances to 10300. There, the group-based communication server 106 retrieves the settings manifest file stored associated with the blueprint application integration corresponding to the blueprint application integration identifier included with the request payload object. The group-based communication server 106 then generates a response payload object comprising the retrieved settings manifest file, the blueprint application integration identifier, and the authentication token associated with the blueprint application integration identifier. The group-based communication server 106 transmits the response payload object to the defined host address identification that the group-based communication server 106 received as part of the request payload object.

The remote system 301A may, in response to receiving the response payload at the defined host address identification included with the request payload object, also validate the response payload object. The validation process may be similar to the validation process that the group-based communication server 106 uses to validate the request payload object. Here, the remote server 306A retrieves, from the remote repository 307A, the authentication token associated with the blueprint application identifier that was received as part of the response payload object. The remote server 306A then compares the authentication token received as part of the response payload object with the authentication token that the remote server 306A retrieved from its remote repository 307A. If the authentication tokens match, then the remote server 306A validates the communication. If the authentication tokens do not match, the remote server 306A may do nothing at all or may transmit the request payload object a second time.

The method 1000 then ends at 10600.

In embodiments, remote systems 1-N may perform similar actions as what was described above in order to retrieve the settings manifest file of their corresponding blueprint application integrations.

FIG. 11 is an exemplary flowchart embodying a method 11000 for updating a settings manifest file of a blueprint application integration. A remote system such as remote system 301A of FIG. 6 may send to the defined host address "https://Group-Based-Communication-System.com/api/app.update" a request payload object that comprises a settings manifest file, a blueprint application identifier, the authentication token corresponding to such blueprint application identifier as reflected in remote repository 307A, and a defined host address identification corresponding to a location where a response request payload object should be sent. With reference to method 11000, at 11100, the group-based communication server 106 receives the request payload object. The group-based communication server 106, in response to receiving such a request payload object, first validates the request payload object. To do so, in certain embodiments, the group-based communication server 106 retrieves the data structure storing the blueprint application integration associated with the received blueprint application identifier. The group-based communication server 106 then compares the authentication token received as part of the request payload object with the authentication token stored in the retrieved data structure. If the authentication tokens match, then the group-based communication server 106 validates the communication. If the authentication tokens do not match, the group-based communication server 106 advances to step 11550, where the group-based communication server 106 generates a response payload object comprising an error message. The group-based communication server 106 transmits the response payload object to the defined host address identification received as part of the request payload object.

In circumstances where the group-based communication server 106 validates a request payload object received at the defined host address "https://Group-Based-Communication-System.com/api/app.update," the group-based communication server 106 then enters step 11300, where the group-based communication server 106 retrieves the settings manifest file associated with the blueprint application integration corresponding to the blueprint application integration identifier included with the request payload object.

At 11400, the group-based communication server 106 then determines the differences between the retrieved settings manifest file and the settings manifest file received as part of the payload object. At 11500, the group-based communication server 106 then updates or modifies the settings manifest file associated with to the blueprint application integration identifier. The group-based communication server 106 thus ensures that the data structure storing the blueprint application integration data includes a settings manifest file that matches the settings manifest file received as part of the payload object.

At 11510, after updating the settings manifest file, the group-based communication server 106 then modifies the remaining blueprint application integration data that is stored in the data structure corresponding to the blueprint application integration that was just updated. For example, in the embodiment employing a blueprint application integration row as a data structure, the group-based communication server 106 then modifies the various row entries in the group-based communication integration row associated with the blueprint application integration that was just updated. The group-based communication server 106 modifies the various row entries to propagate the updates effectuated by updating the settings manifest file.

For example, an exemplary and non-limiting embodiment is herein discussed to provide further clarity, which consists of a circumstance where the group-based communication server 106 modifies a defined host address identification in the settings manifest file. After updating the settings manifest file, the group-based communication server 106 then also modifies the blueprint application integration row where the old host address identification is stored. The group-based communication server 106 thus causes the blueprint application integration row to include the updated host address identification.

After updating the settings manifest file and propagating the update into any other data structures stored in the group-based communication repository 107, the group-based communication server 106 then enters step 11520. There, the group-based communication server 106 generates a response payload object comprising: the updated settings manifest file, the blueprint application integration identifier, the authentication token associated with the blueprint application integration identifier, and an indication that the update was successful. The group-based communication server 106 then transmits the response payload object to the defined host address identification that the group-based communication server 106 received as part of the request payload object.

If the group-based communication server 106 runs into any problems during the update process and cannot, for any reason, update the settings manifest file, the group-based communication server 106 generates a response payload object comprising the updated settings manifest file, the blueprint application integration identifier, the authentication token associated with the blueprint application integration identifier, and an indication that the update failed. The group-based communication server 106 transmits the response payload object to the defined host address identification that the group-based communication server 106 received as part of the request payload object.

The remote system 301A may, in response to receiving the response payload at the defined host address identification included with the request payload object, also validate the response payload object. The validation process may be similar to the validation process that the group-based communication server 106 uses to validate the request payload object. Here, the remote server 306A retrieves, from the remote repository 307A, the authentication token associated with the blueprint application identifier that was received as part of the response payload object. The remote server 306A then compares the authentication token received as part of the response payload object with the authentication token that the remote server 306A retrieved from its remote repository 307A. If the authentication tokens match, then the remote server 306A validates the communication. If the authentication tokens do not match, the remote server 306A may do nothing at all or may transmit the request payload object a second time.

In circumstances where the remote server 306A validates a response payload object received at the defined host address identification included with the request payload object, the remote server 306A then parses the payload object to determine whether it includes an indication that the update was successful. The remote server 306A may implement different responses in circumstances where it determines that the update was not successful. For example, the remote server 306A may periodically transmit the request payload object to request an update of the settings manifest file. The remote server 306A may periodically transmit the request payload object until it receives a response payload object that indicates that the update was successful.

As a result of the Application Settings API discussed herein, a remote server 306A may thus change any of the application scopes, defined host address identifications, and/or functional features implemented by a blueprint application integration row.

Application Settings API with Granular API Endpoints to Update Specific Features In an alternative embodiment of the Application Settings API, the Application Settings API comprises a plurality of network endpoints where each network endpoint supports a specific method for updating specific features of a blueprint application integration. This alternative embodiment of the Application Settings API does not require a settings manifest file and thus, when this embodiment is implemented, neither the blueprint application nor the blueprint application integrations include a settings manifest file. Instead, only data structures, such as the blueprint application rows and the blueprint application integration rows, are required. This embodiment of the Application Settings API thus enables external entities, such as remote systems 1-N of FIG. 6, to update the values stored in the blueprint application integration rows in one step as opposed to first causing the group-based communication server 106 to update the settings manifest file and then propagate the update into the blueprint application rows.

For this embodiment, the remote systems 1-N may send payload objects comprising a plurality of values that specify the update to be performed. For example, this discussion will consider an exemplary and non-limiting embodiment of a method for adding a slash command to a blueprint application integration.

In this embodiment, the group-based communication system 105 hosts a network endpoint at a location defined by defined host address identification "https://Group-Based-Communicaiton-System.com/api/developer.apps.commands.add." The group-based communication system 105 is configured to receive request payload objects at this defined host address identification. As a result of receiving a payload object to this defined host address identification, the group-based communication server 106 carries out processes associated with a method for adding a slash command to a blueprint application integration.

To properly execute the processes associated with the function, the group-based communication server 106 requires that the request payload object comprise information defining the blueprint application integration that may be updated and the details of the slash command that will be added to the blueprint application integration. Thus, a properly formatted request payload object for this defined host address identification comprises, for example, an authentication token, a blueprint application integration identifier, a description of the slash command, a name of the slash command, the format of the input text that triggers the slash command (e.g. "/hello"), a defined host address identification where a payload object may be transmitted when the slash command is invoked, and a defined host address identification where a response request payload object should be transmitted at the end of executing the method for adding the slash command.

In response to receiving a properly formatted request payload object at the defined host address identification "https://Group-Based-Communicaiton-System.com/api/developer.apps.commands.add," the group-based communication server 106 first validates the request payload object. To do so, in certain embodiments, the group-based communication server 106 retrieves the data structure storing the blueprint application integration associated with the received blueprint application identifier. The group-based communication server 106 then compares the authentication token received as part of the request payload object with the authentication token stored in the retrieved data structure. If the authentication tokens match, then the group-based communication server 106 validates the communication. If the authentication tokens do not match, the group-based communication server 106 may, in response, transmit a response payload object comprising an error message. The group-based communication server 106 transmits the response payload object to the defined host address identification received as part of the request payload object.

In circumstances where the group-based communication server 106 validates a request payload object received at the defined host address "https://Group-Based-Communicaiton-System.com/api/developer.apps.commands.add," the group-based communication server 106 then retrieves and updates the data structure storing the blueprint application integration data in order to define the slash command. For example, in the embodiment where the data structure comprises a blueprint application integration row, the group-based communication server 106 causes the blueprint application integration row to enable the slash command feature, store the name of the slash command, store values indicating the input text that triggers the slash command (e.g. "/hello"), and a defined host address identification where a payload object may be transmitted when the slash command is invoked.

After updating the data structures storing blueprint application integration data, the group-based communication server 106 then generates a response payload object comprising: the blueprint application integration identifier, the authentication token associated with the blueprint application integration identifier, and an indication that the update was successful. The group-based communication server 106 transmits the response payload object to the defined host address identification that the group-based communication server 106 received as part of the request payload object.

If the group-based communication server 106 runs into any problems during the update process and cannot, for any reason, update the settings manifest file, the group-based communication server 106 generates a response payload object comprising: the blueprint application integration identifier, the authentication token associated with the blueprint application integration identifier, and an indication that the update failed. The group-based communication server 106 transmits the response payload object to the defined host address identification that the group-based communication server 106 received as part of the request payload object.

The remote system 301A may, in response to receiving the response payload at the defined host address identification included with the request payload object, also validate the response payload object. The validation process may be similar to the validation process that the group-based communication server 106 uses to validate the request payload object. Here, the remote server 306A retrieves, from the remote repository 307A, the authentication token associated with the blueprint application identifier that was received as part of the response payload object. The remote server 306A then compares the authentication token received as part of the response payload object with the authentication token that the remote server 306A retrieved from its remote repository 307A. If the authentication tokens match, then the remote server 306A validates the communication. If the authentication tokens do not match, the remote server 306A may do nothing at all or may transmit the request payload object a second time.

In circumstances where the remote server 306A validates a response payload object received at the defined host address identification included with the request payload object, the remote server 306A then parses the payload object to determine whether it includes an indication that the update was successful. The remote server 306A may implement different responses in circumstances where it determines that the update was not successful. For example, the remote server 306A may periodically transmit the request payload object to request an update of the settings manifest file. The remote server 306A may periodically transmit the request payload object until it receives a response payload object that indicates that the update was successful.

As a result of the Application Settings API discussed herein, a remote server 306A may thus change any of the application scopes, defined host address identifications, and/or functional features implemented by a blueprint application integration row.

Additional features may be updated with a similar mechanism as what was described above in the context of the method for adding a slash command. For example, other network endpoints may support methods for requesting the settings of blueprint application integrations, to add or update interactive components, to add or update redirect defined host address identifications associated with OAuth processes, to add or update event subscriptions, to add or update a bot user, and the like. Each of these network endpoints would require a properly formatted request payload object. Additionally, the information included in the request payload objects would need to be validated before the group-based communication system 105 executes the requested operations.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. One or more non-transitory computer-readable media storing computer-executable instructions that, when executed by at least one processor, perform a method for managing permissions for third-party applications in a group-based communication system, the method comprising:
   receiving a defined scopes-and-features request for a third-party application, the defined scopes-and-features request indicating a requested set of permissions associated with a plurality of users of the group-based communication system for the third-party application, wherein the requested set of permissions specifies one or more actions of the third-party application associated with one or more group-based communication system objects associated with the group-based communication system, and wherein each user of a plurality of users is associated with one or more group identifiers;
   generating an authentication token configured to enable the requested set of permissions for the third-party application, wherein the authentication token is associated with the defined scopes-and-features request for the third-party application and the one or more group identifiers;
   transmitting the authentication token to a third-party application provider associated with the third-party application for validation of the requested set of permissions associated with the third-party application for the one or more group-based communication system objects, wherein the validation of the requested set of permissions comprises validation of the one or more group identifiers; and
   storing, in a group-based communication system repository, information related to the requested set of permissions for the third-party application, wherein the information includes the one or more group identifiers.

2. The one or more non-transitory computer-readable media of claim 1, wherein the one or more actions include at least one of:
   viewing a history of the one or more group-based communication system objects, reading the one or more group-based communication system objects, or writing to the one or more group-based communication system objects.

3. The one or more non-transitory computer-readable media of claim 1, wherein the one or more group-based communication system objects include at least one of: a file object, a search object, a chat object, a reaction object, a channel object, a do not disturb object, an instant message object, or an emoji object.

4. The one or more non-transitory computer-readable media of claim 1, wherein the defined scopes-and-features request corresponds to a workspace within the group-based communication system and wherein the authentication token enables the requested set of permissions for group-based communication system objects only within the workspace.

5. The one or more non-transitory computer-readable media of claim 1, wherein the defined scopes-and-features request corresponds to a channel within the group-based communication system and wherein the authentication token enables the requested set of permissions for group-based communication system objects only within the channel.

6. The one or more non-transitory computer-readable media of claim 1, the method further comprising:
   receiving a modification request to modify the defined scopes-and-features request for the third-party application;
   in response to the modification request to modify the defined scopes-and-features request, generating an updated set of permissions for the third-party application; and
   storing, in the group-based communication system repository, updated information related to the updated set of permissions for the third-party application.

7. The one or more non-transitory computer-readable media of claim 6, the method further comprising:
   generating an updated authentication token configured to enable the updated set of permissions for the third-party application; and
   transmitting the updated authentication token to the third-party application provider associated with the third-party application.

8. A method for managing permissions for third-party applications in a group-based communication system comprising:
   receiving a defined scopes-and-features request for a third-party application, the defined scopes-and-features request indicating a requested set of permissions associated with a plurality of users of the group-based communication system for the third-party application, wherein the requested set of permissions specifies one or more actions of the third-party application associated with one or more group-based communication system objects associated with the group-based communication system, and wherein each user of a plurality of users is associated with one or more group identifiers;
   generating an authentication token configured to enable the requested set of permissions for the third-party application, wherein the authentication token is associated with the defined scopes-and-features request for the third-party application and the one or more group identifiers;
   transmitting the authentication token to a third-party application provider associated with the third-party application for validation of the requested set of permissions associated with the third-party application for the one or more group-based communication system objects, wherein the validation of the requested set of permissions comprises validation of the one or more group identifiers; and
   storing, in a group-based communication system repository, information related to the requested set of permissions for the third-party application, wherein the information includes the one or more group identifiers.

9. The method of claim 8, wherein the one or more actions include at least one of:
viewing a history of the one or more group-based communication system objects, reading the one or more group-based communication system objects, or writing to the one or more group-based communication system objects.

10. The method of claim 8, wherein the one or more group-based communication system objects include at least one of a file object, a search object, a chat object, a reaction object, a channel object, a do not disturb object, an instant message object, or an emoji object.

11. The method of claim 8, wherein the defined scopes-and-features request corresponds to a workspace within the group-based communication system and wherein the authentication token enables the requested set of permissions for group-based communication system objects only within the workspace.

12. The method of claim 8, wherein the defined scopes-and-features request corresponds to a channel within the group-based communication system and wherein the authentication token enables the requested set of permissions for group-based communication system objects only within the channel.

13. The method of claim 8, further comprising:
receiving a modification request to modify the defined scopes-and-features request for the third-party application;
in response to the modification request to modify the defined scopes-and-features request, generating an updated set of permissions for the third-party application; and
storing, in the group-based communication system repository, updated information related to the updated set of permissions for the third-party application.

14. The method of claim 13, further comprising:
generating an updated authentication token configured to enable the updated set of permissions for the third-party application; and
transmitting the updated authentication token to the third-party application provider associated with the third-party application.

15. A system comprising at least one processor and at least one non-transitory memory storing computer executable instructions that when executed by the at least one processor cause the system to carry out a method for managing permissions for third-party applications in a group-based communication system comprising:
receiving a defined scopes-and-features request for a third-party application, the defined scopes-and-features request indicating a requested set of permissions associated with a plurality of users of the group-based communication system for the third-party application, wherein the requested set of permissions specifies one or more actions of the third-party application associated with one or more group-based communication system objects associated with the group-based communication system, and wherein each user of a plurality of users is associated with one or more group identifiers;
generating an authentication token configured to enable the requested set of permissions for the third-party application, wherein the authentication token is associated with the defined scopes-and-features request for the third-party application and the one or more group identifiers;
transmitting the authentication token to a third-party application provider associated with the third-party application for validation of the requested set of permissions associated with the third-party application for the one or more group-based communication system objects, wherein the validation of the requested set of permissions comprises validation of the one or more group identifiers; and
storing, in a group-based communication system repository, information related to the requested set of permissions for the third-party application, wherein the information includes the one or more group identifiers.

16. The system of claim 15, wherein the one or more actions include at least one of:
viewing a history of the one or more group-based communication system objects, reading the one or more group-based communication system objects, or writing to the one or more group-based communication system objects.

17. The system of claim 15, wherein the one or more group-based communication system objects include at least one of a file object, a search object, a chat object, a reaction object, a channel object, a do not disturb object, an instant message object, or an emoji object.

18. The system of claim 15, wherein the defined scopes-and-features request corresponds to a workspace within the group-based communication system and wherein the authentication token enables the requested set of permissions for group-based communication system objects only within the workspace.

19. The system of claim 15, wherein the defined scopes-and-features request corresponds to a channel within the group-based communication system and wherein the authentication token enables the requested set of permissions for group-based communication system objects only within the channel.

20. The system of claim 15, the method further comprising:
receiving a request to modify the defined scopes-and-features request for the third-party application;
in response to the request to modify the defined scopes-and-features request, generating an updated set of permissions for the third-party application;
generating an updated authentication token configured to enable the updated set of permissions for the third-party application;
transmitting the updated authentication token to the third-party application provider associated with the third-party application; and
storing, in the group-based communication system repository, updated information related to the updated set of permissions for the third-party application.

* * * * *